US012699713B2

(12) United States Patent
Guo et al.

(10) Patent No.: US 12,699,713 B2
(45) Date of Patent: Aug. 4, 2026

(54) VIRTUAL COLUMN CONSTRUCTION METHOD BASED ON DATA LAKE AND DATA QUERY METHOD

(71) Applicant: Beijing Volcano Engine Technology Co., Ltd., Beijing (CN)

(72) Inventors: Jun Guo, Beijing (CN); Jiajun Xie, Beijing (CN); Ke Sun, Beijing (CN); Xuan Luo, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 13 days.

(21) Appl. No.: 18/841,279

(22) PCT Filed: May 18, 2023

(86) PCT No.: PCT/CN2023/094998
§ 371 (c)(1),
(2) Date: Aug. 23, 2024

(87) PCT Pub. No.: WO2024/021790
PCT Pub. Date: Feb. 1, 2024

(65) Prior Publication Data
US 2025/0165501 A1     May 22, 2025

(30) Foreign Application Priority Data
Jul. 27, 2022     (CN) .......................... 202210892749.6

(51) Int. Cl.
G06F 16/28          (2019.01)
G06F 16/2458        (2019.01)

(52) U.S. Cl.
CPC ........ G06F 16/283 (2019.01); G06F 16/2462 (2019.01)

(58) Field of Classification Search
CPC .. G06F 16/283; G06F 16/2462; G06F 16/221; G06F 16/2433; G06F 16/2453; G06F 16/2455
(Continued)

(56)          References Cited
U.S. PATENT DOCUMENTS

2009/0150366 A1*   6/2009   Basu ...................... G06F 16/284
2009/0150413 A1*   6/2009   Basu ................ G06F 16/24545
(Continued)

FOREIGN PATENT DOCUMENTS

CN          111680030 A      9/2020
CN          111797095 A     10/2020
(Continued)

OTHER PUBLICATIONS

ISA China National Intellectual Property Administration, International Search Report and Written Opinion Issued in Application No. PCT/CN2023/094998, Jun. 23, 2023, WIPO, 13 pages.
(Continued)

*Primary Examiner* — Michael Pham
(74) *Attorney, Agent, or Firm* — Alleman Hall LLP

(57)          ABSTRACT
The present application discloses a virtual column construction method based on data lake and a data query method. The present disclosure includes: first, automatically performing expression statistical analysis on a large quantity of statements to be analyzed in a data lake, so as to obtain an expression to be used; next, automatically constructing a virtual column construction request corresponding to the expression to be used, according to virtual column construction description information corresponding to the expression to be used, so that the virtual column construction request is used to request construction of a virtual column that can represent the expression to be used; then, according to the virtual column construction request, constructing a virtual
(Continued)

column corresponding to the expression to be used, to enable the virtual column to represent the expression to be used.

20 Claims, 5 Drawing Sheets

(58) Field of Classification Search
USPC .......................................................... 707/736
See application file for complete search history.

(56) References Cited

U.S. PATENT DOCUMENTS

| | | | |
|---|---|---|---|
| 2016/0205101 A1 | 7/2016 | Verma et al. | |
| 2017/0031975 A1* | 2/2017 | Mishra ................ | G06F 16/2282 |
| 2017/0031976 A1* | 2/2017 | Chavan ................ | G06F 16/2393 |
| 2021/0064613 A1 | 3/2021 | Fender et al. | |

FOREIGN PATENT DOCUMENTS

| | | | |
|---|---|---|---|
| CN | 107451149 | B | 11/2020 |
| CN | 112347133 | A | 2/2021 |
| CN | 113032423 | B | 8/2021 |
| CN | 113672781 | A | 11/2021 |
| CN | 114286994 | A | 4/2022 |
| CN | 114416773 | A | 4/2022 |
| CN | 115221191 | A | 10/2022 |

OTHER PUBLICATIONS

China National Intellectual Property Administration, Office Action and Search Report Issued in Application No. 202210892749.6, Sep. 24, 2025, 16 pages.
Tony the Barber, "Generated Columns/Computed Columns in SQL and Implementations in Mainstream Databases," CSDN, Available Online at https://tonydong.blog.csdn.net/article/details/104119208, Feb. 4, 2020, 16 pages.

* cited by examiner

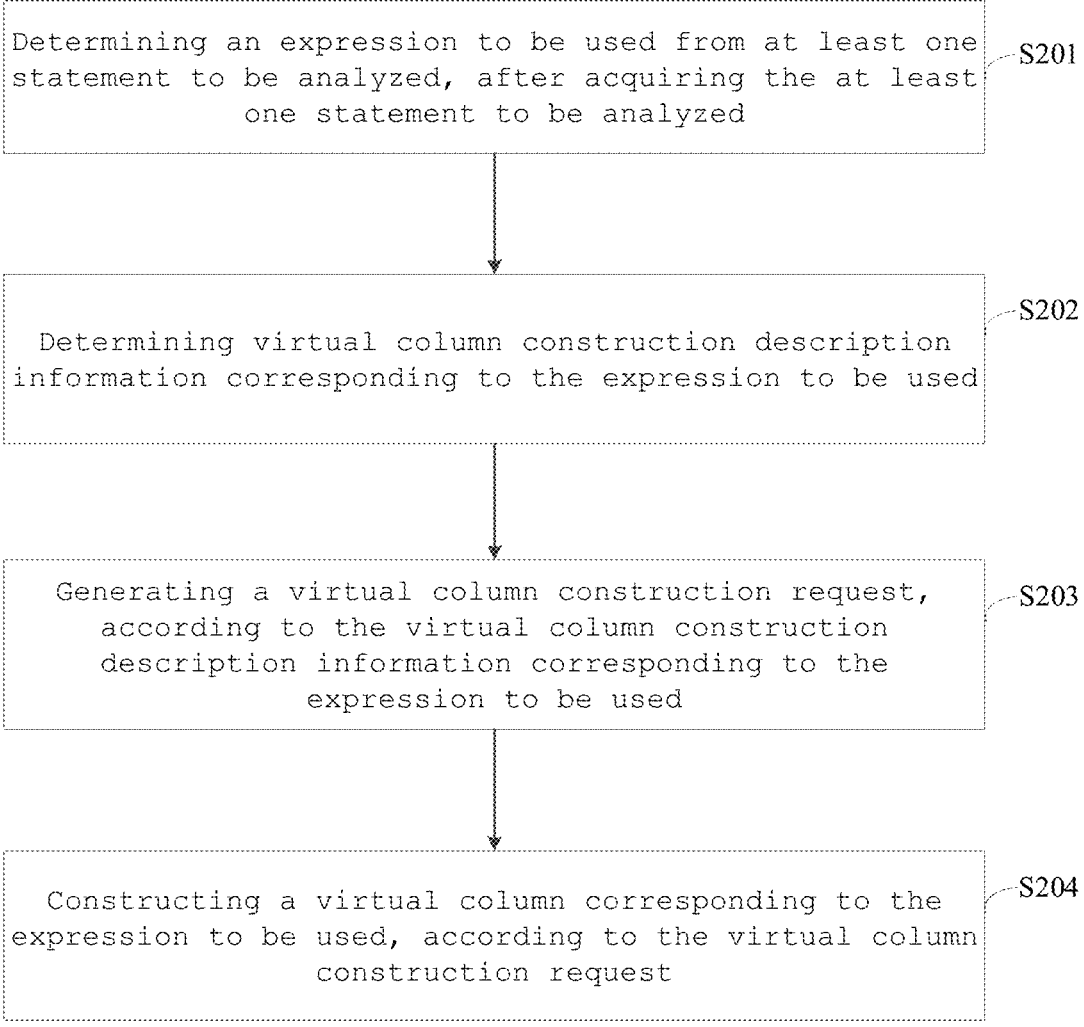

Determining an expression to be used from at least one statement to be analyzed, after acquiring the at least one statement to be analyzed                    S201

Determining virtual column construction description information corresponding to the expression to be used                    S202

Generating a virtual column construction request, according to the virtual column construction description information corresponding to the expression to be used                    S203

Constructing a virtual column corresponding to the expression to be used, according to the virtual column construction request                    S204

Fig.2

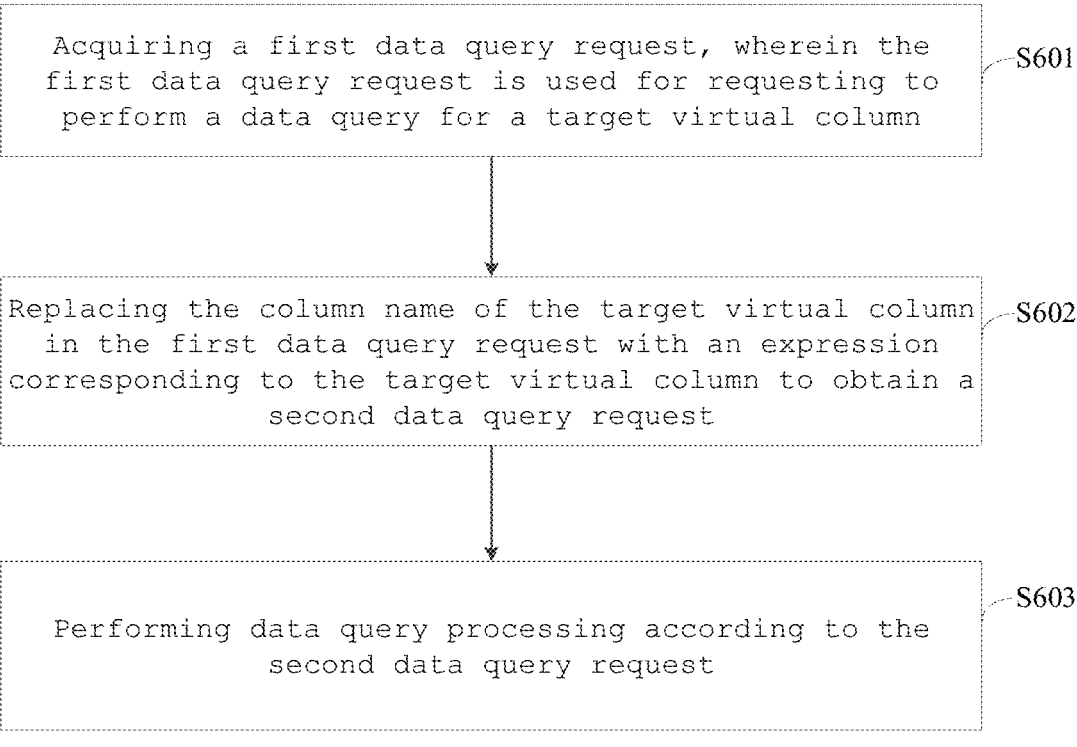

Acquiring a first data query request, wherein the first data query request is used for requesting to perform a data query for a target virtual column ⟋S601

Replacing the column name of the target virtual column in the first data query request with an expression corresponding to the target virtual column to obtain a second data query request ⟋S602

Performing data query processing according to the second data query request ⟋S603

Fig.6

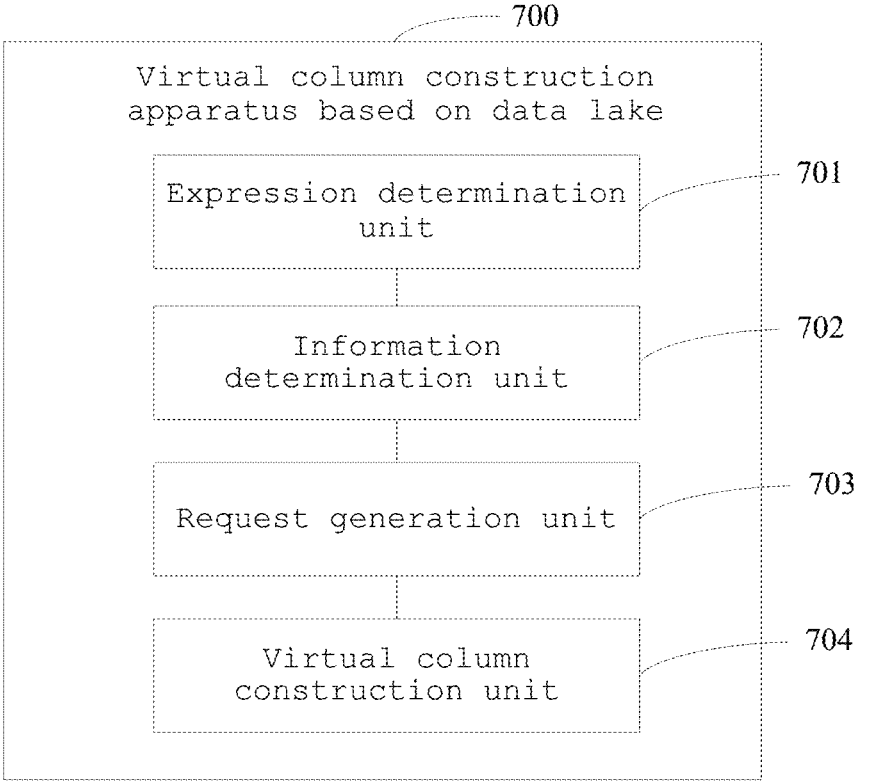

700

Virtual column construction apparatus based on data lake

Expression determination unit —— 701

Information determination unit —— 702

Request generation unit —— 703

Virtual column construction unit —— 704

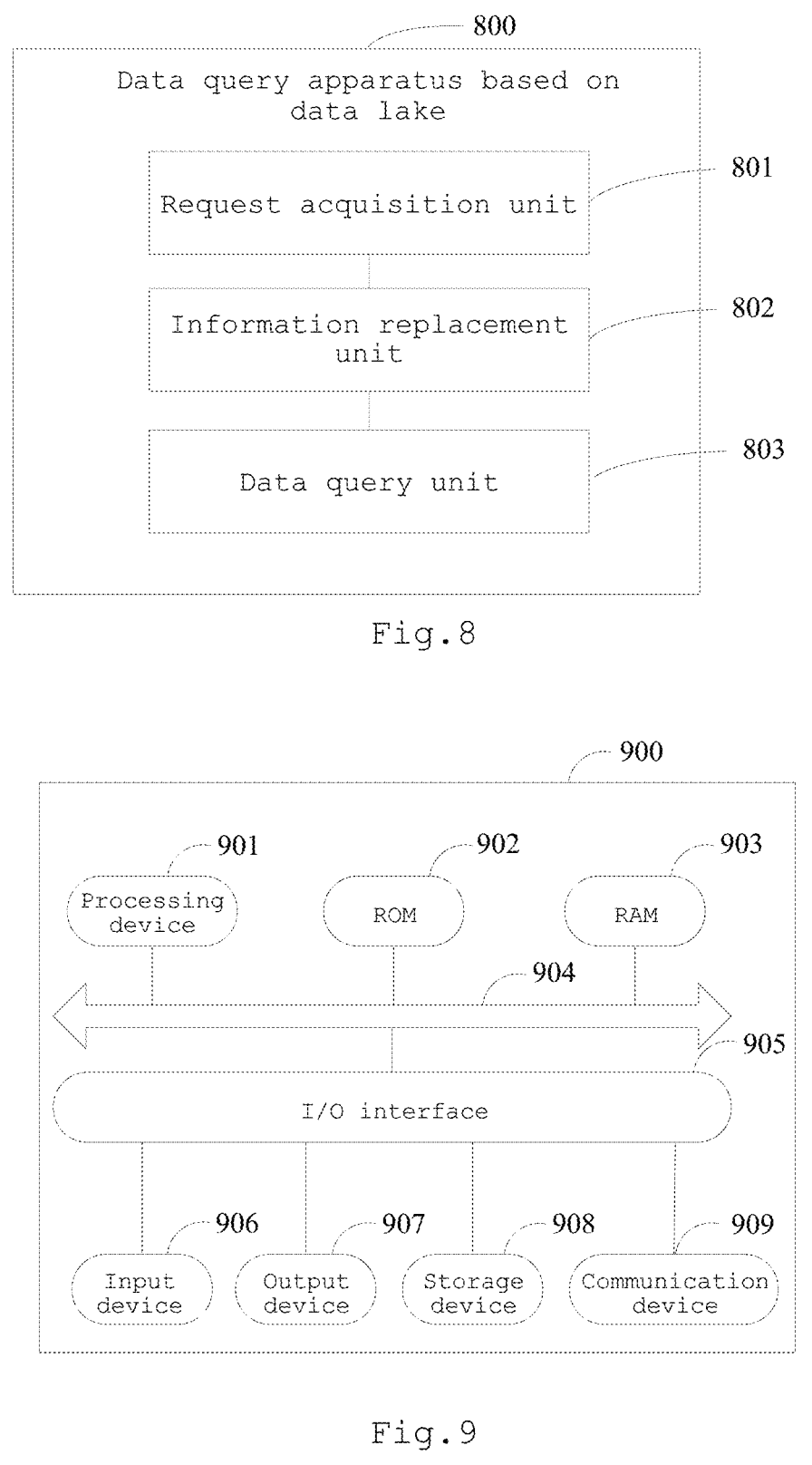

Data query apparatus based on data lake

Request acquisition unit — 801

Information replacement unit — 802

Data query unit — 803

Processing device — 901

ROM — 902

RAM — 903

— 904

— 905

I/O interface

Input device — 906

Output device — 907

Storage device — 908

Communication device — 909

Fig.9

VIRTUAL COLUMN CONSTRUCTION METHOD BASED ON DATA LAKE AND DATA QUERY METHOD

This application is a U.S. National Stage under 35 U.S.C. § 371 of International Application No. PCT/CN2023/094998, as filed on May 18, 2023, which is based on and claims the priority to the Chinese patent application No. 202210892749.6 entitled "VIRTUAL COLUMN CONSTRUCTION METHOD BASED ON DATA LAKE AND DATA QUERY METHOD" and filed with the Chinese patent office on Jul. 27, 2022. The disclosure of each of these applications is incorporated by reference into the present application.

TECHNICAL FIELD

The present application relates to the technical field of data processing, and in particular, to a virtual column construction method based on a data lake and a data query method.

BACKGROUND

With the development of information technology, there are more and more application scenarios for a data lake.

In fact, for data, there may be a large number of data query tasks every day to meet users' data query requirements.

SUMMARY

In order to achieve the above objective, technical solutions provided in embodiments of the present application are as follows:

An embodiment of the present application provides a virtual column construction method based on data lake, comprising:

determining an expression to be used from at least one statement to be analyzed, after acquiring the at least one statement to be analyzed;

determining virtual column construction description information corresponding to the expression to be used, wherein the virtual column construction description information comprises the expression to be used;

generating a virtual column construction request, according to the virtual column construction description information corresponding to the expression to be used; and constructing a virtual column corresponding to the expression to be used, according to the virtual column construction request.

In one possible implementation, the number of the statement to be analyzed is N; and the determining an expression to be used from at least one statement to be analyzed comprises:

determining a n-th expression to be analyzed from a n-th statement to be analyzed, wherein n is a positive integer, n≤N, and N is a positive integer;

performing statistical analysis processing on N expressions to be analyzed to obtain an expression statistical result; and if the expression statistical result indicates that an occurrence frequency of a first expression in the N expressions to be analyzed is higher than a preset frequency threshold, determining the first expression as the expression to be used.

In one possible implementation, the determining a n-th expression to be analyzed from a n-th statement to be analyzed comprises:

performing syntax conversion processing on the n-th statement to be analyzed to obtain a syntax conversion result; and extracting the n-th expression to be analyzed from the syntax conversion result.

In one possible implementation, the method further comprises:

performing syntax tree construction processing on the n-th expression to be analyzed to obtain a syntax tree of the n-th expression to be analyzed; and the performing statistical analysis processing on N expressions to be analyzed to obtain an expression statistical result comprises:

performing statistical analysis processing on syntax trees of the N expressions to be analyzed to obtain the expression statistical result.

In one possible implementation, the virtual column construction description information further comprises a column name; and a process of determining the column name corresponding to the expression to be used comprises:

if at least one statement to be referred exists in the at least one statement to be analyzed, determining the column name corresponding to the expression to be used from the at least one statement to be referred, wherein a preset semantic identity condition is met between an expression carried by the statement to be referred and the expression to be used, and the statement to be referred comprises a column name corresponding to the expression carried by the statement to be referred.

In one possible implementation, the determining the column name corresponding to the expression to be used from the at least one statement to be referred comprises:

performing statistical analysis processing on the column names corresponding to the expressions carried by the at least one statement to be referred to obtain a column name statistical result; and determining the column name corresponding to the expression to be used according to the column name statistical result.

In one possible implementation, the column names corresponding to the expressions carried by the at least one statement to be referred comprise a target column name; and the determining the column name corresponding to the expression to be used according to the column name statistical result comprises:

if the column name statistical result indicates that an occurrence frequency of the target column name meets a preset frequency condition, determining the target column name as the column name corresponding to the expression to be used.

In one possible implementation, the method further comprises:

if the statement to be referred does not exist in the at least one statement to be analyzed, determining a second expression from at least one expression to be matched which is preset, according to similarity representation data between the at least one expression to be matched and the expression to be used, wherein the similarity representation data between the second expression and the expression to be used meets a preset similarity condition;

searching for a column name corresponding to the second expression from a pre-constructed mapping relation, wherein the mapping relation is used for recording a correspondence between respective expressions to be matched and column names corresponding thereto; and determining the column name corresponding to the expression to be used according to the column name corresponding to the second expression.

In one possible implementation, the number of the expression to be matched is M; and a process of determining the similarity representation data between a m-th expression to be matched and the expression to be used comprises:

determining a field name vector and a keyword vector of the expression to be used; and determining the similarity representation data between the m-th expression to be matched and the expression to be used, according to a similarity between the field name vector of the expression to be used and a field name vector of the m-th expression to be matched and a similarity between the keyword vector of the expression to be used and a keyword vector of the m-th expression to be matched.

In one possible implementation, a process of determining the field name vector of the expression to be used comprises:

performing fieldname extraction processing on the expression to be used to obtain a field name extraction result; and performing vectorizing processing on the field name extraction result to obtain the field name vector of the expression to be used.

In one possible implementation, a process of determining the keyword vector of the expression to be used comprises:

performing keyword extraction processing on the expression to be used to obtain a keyword extraction result; and performing vectorizing processing on the keyword extraction result to obtain the keyword vector of the expression to be used.

In one possible implementation, the virtual column construction description information further comprises a data type; and the data type is determined according to a data type corresponding to a column name carried by the expression to be used.

An embodiment of the present application further provides a data query method based on a data lake, comprising:

acquiring a first data query request, wherein the first data query request is used for requesting to perform a data query for a target virtual column; wherein the target virtual column is constructed by using any of the implementations of the virtual column construction method based on a data lake provided in the embodiments of the present application;

replacing the column name of the target virtual column in the first data query request with an expression corresponding to the target virtual column to obtain a second data query request; and performing data query processing according to the second data query request.

An embodiment of the present application further provides a virtual column construction apparatus based on a data lake, comprising:

an expression determination unit configured to determine an expression to be used from at least one statement to be analyzed, after acquiring the at least one statement to be analyzed;

an information determination unit configured to determine virtual column construction description information corresponding to the expression to be used, wherein the virtual column construction description information comprises the expression to be used;

a request generation unit configured to generate a virtual column construction request, according to the virtual column construction description information corresponding to the expression to be used; and a virtual column construction unit configured to construct a virtual column corresponding to the expression to be used, according to the virtual column construction request.

An embodiment of the present application further provides a data query apparatus based on a data lake, comprising:

a request acquisition unit configured to acquire a first data query request, wherein the first data query request is used for requesting to perform a data query for a target virtual column; wherein the target virtual column is constructed by using any of the implementations of the virtual column construction method based on a data lake provided in the embodiments of the present application;

an information replacement unit configured to replace the column name of the target virtual column in the first data query request with an expression corresponding to the target virtual column to obtain a second data query request; and a data query unit configured to perform data query processing according to the second data query request.

An embodiment of the present application further provides an electronic device, comprising: a processor and a memory, wherein the memory is configured to store instructions or a computer program; and the processor is configured to execute the instructions or the computer program in the memory, such that the electronic device performs any of the implementations of the virtual column construction method based on a data lake provided in the embodiments of the present application, or performs any of the implementations of the data query method based on a data lake provided in the embodiments of the present application.

An embodiment of the present application further provides a computer-readable medium having therein stored instructions or a computer program which, when run on a device, causes the device to perform any of the implementations of the virtual column construction method based on a data lake provided in the embodiments of the present application, or to perform any of the implementations of the data query method based on a data lake provided in the embodiments of the present application.

An embodiment of the present application further provides a computer program product, comprising a computer program carried on a non-transitory computer-readable medium, wherein the computer program comprises program codes for performing any of the implementations of the virtual column construction method based on a data lake provided in the embodiments of the present application, or program codes for performing any of the implementations of the data query method based on a data lake provided in the embodiments of the present application.

BRIEF DESCRIPTION OF THE DRAWINGS

In order to more clearly illustrate the technical solutions in the embodiments of the present application or the related art, the drawings that need to be used in the description of the embodiments or the related art will be briefly described below, it is apparent that the drawings in the following description are only some embodiments described in the present application, and for one of ordinary skill in the art, other drawings can be obtained according to these drawings without paying creative labor.

FIG. 2 is a flow diagram of a virtual column construction method based on a data lake provided by an embodiment of the present application;

FIG. 6 is a flow diagram of a data query method based on a data lake provided by an embodiment of the present application;

FIG. 7 is a schematic structural diagram of a virtual column construction apparatus based on a data lake provided by an embodiment of the present application;

FIG. 8 is a schematic structural diagram of a data query apparatus based on a data lake provided by an embodiment of the present application;

FIG. 9 is a schematic structural diagram of an electronic device provided by an embodiment of the present application.

DETAILED DESCRIPTION

Figure 1:
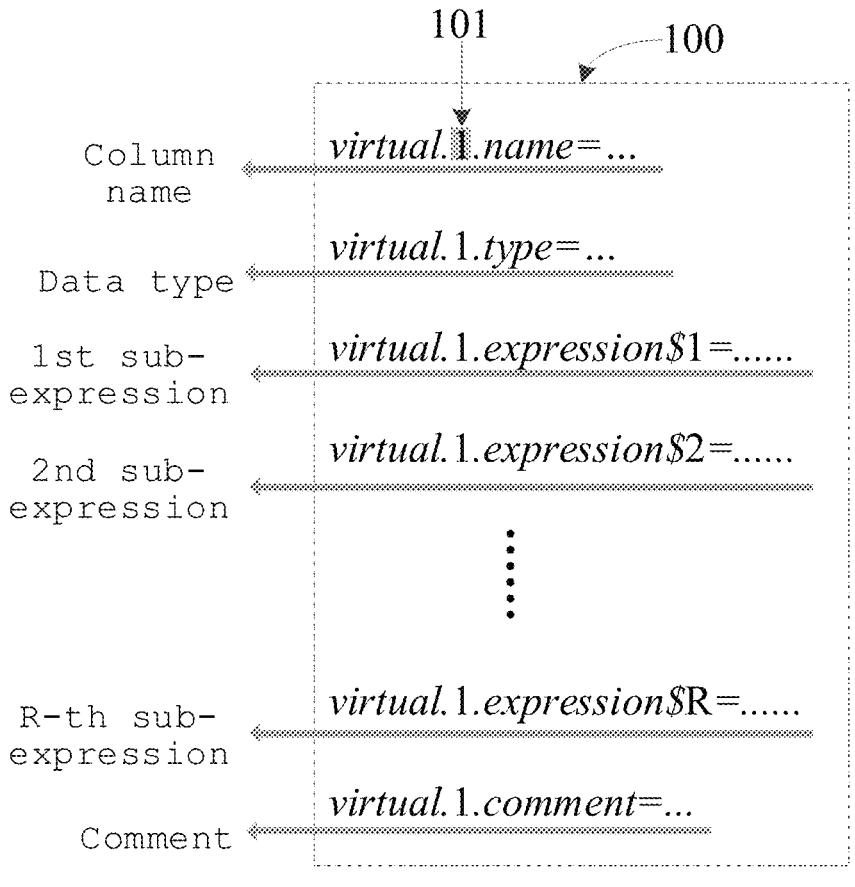
FIG. 1 is a schematic diagram of metadata of a virtual column provided by an embodiment of the present application.

However, there are defects in some data query solutions, resulting in poor user data query experience.

The present application provides a virtual column construction method based on a data lake and a data query method, capable of improving user data query experience.

Compared with the related art, the embodiments of the present application at least have the following advantages:

According to the technical solutions provided by the embodiments of the present application, for a data lake scenario, first, expression statistical analysis can be automatically performed on a large number of statements to be analyzed (for example, SQL statements under various engines) in the data lake, so as to obtain an expression to be used that meets a preset virtual column construction condition (for example, an expression to be used with a relatively high occurrence frequency); next, a virtual column construction request corresponding to the expression to be used is automatically constructed according to virtual column construction description information (such as a column name, a data type, and an expression) corresponding to the expression to be used, such that the virtual column construction request is used for requesting to construct a virtual column that can represent the expression to be used; and then, according to the virtual column construction request, a virtual column corresponding to the expression to be used is constructed, to enable the virtual column to represent the expression to be used, such that a user can automatically trigger a data query request for the expression to be used by means of a data query request for the virtual column in the future, thus it is possible to avoid problems that occur when the user manually inputs the data query request for the expression to be used (for example, how to write a correct expression, etc.), thereby it is possible to effectively improve the user data query experience.

In order to facilitate understanding of the technical solutions of the present application, some technical terms involved in the present application are described below.

Structured query language (SQL) is a database query and programming language; and SQL can be used for data access, data query, data update, data management, etc. for a data lake.

The data lake is a centralized repository that allows a user to store, at any scale, multi-sourced, structured and unstructured data, and the data can be stored as it is without the need to structure the data, and the data is processed by operating different types of analyses, such as: big data processing, real-time analysis, machine learning, so as to guide better decision-making.

JavaCC (Java Compiler Compiler) is a generating program capable of generating syntax and lexical analyzers.

Based on the above technical terms, the technical solutions of the present application are described below.

The present application provides a virtual column construction method based on a data lake, comprising: for a data lake scenario, first, expression statistical analysis may be automatically performed on a large number of statements to be analyzed (for example, SQL statements under various engines) in the data lake, so as to obtain an expression to be used (for example, an expression "a+1") that meets a preset virtual column construction condition; next, a virtual column construction request corresponding to the expression to be used is automatically constructed according to virtual column construction description information (such as a column name, a data type, an expression, and the like) corresponding to the expression to be used, such that the virtual column construction request is used for requesting to construct a virtual column that can represent the expression to be used; and then, according to the virtual column construction request, a virtual column (for example, a virtual column with a character "c" as the column name) corresponding to the expression to be used is constructed, to enable the virtual column to represent the expression to be used, such that a user can automatically trigger a data query request for the expression to be used by means of a data query request for the virtual column (for example, an SQL statement "SELECT c FROM t1") in the future, thus it is possible to avoid problems that occur when the user manually inputs the data query request for the expression to be used (for example, how to write a correct expression, etc.), thereby it is possible to effectively improve the user data query experience.

In addition, the embodiments of the present application do not limit an execution subject of the virtual column construction method based on a data lake (or the data query method based on a data lake), for example, the virtual column construction method based on a data lake (or the data query method based on a data lake) provided in the embodiments of the present application may be applied to a device with a data processing function, such as a terminal device, a server, or the like. The terminal device may be a smartphone, a computer, a personal digital assistant (PDA), a tablet computer, or the like. The server may be a stand-alone server, a cluster server, or a cloud server.

In order to enable those skilled in the art to better understand the solutions of the present application, the technical solutions in the embodiments of the present application will be clearly and completely described below in conjunction with the drawings in the embodiments of the present application, and it is apparent that the described embodiments are only a part of the embodiments of the present application, rather than all of them. Based on the embodiments in the present application, all other embodiments, which are obtained by one of ordinary skill in the art without making any creative labor, fall within the scope of protection of the present application.

In order to facilitate better understanding of the technical solutions of the present application, related content of a virtual column will be described below first.

Related Content of Virtual Column

A virtual column is used for representing a certain expression. For example, an expression "a+1" may be represented by using a virtual column with a character "c" as a column name (virtual column c for short hereinafter), such that a user may achieve a data query purpose for the expression "a+1" by means of a query statement for the virtual column (e.g., an SQL statement "SELECT c FROM t1") in the future.

In order to enable the use of a virtual column in a data lake, an embodiment of the present application further provides some syntax content of a virtual column, which will be described below in conjunction with Tables 1 to 4.

(1) Related content of a construction statement for a virtual column: as shown in the following Table 1, for a certain expression (e.g., an expression "a+1"), first, an SQL statement (e.g., an SQL statement shown in a 2nd row and 1st column in the following Table 1) for constructing a virtual column for the expression may be generated by using a syntax definition shown in the Table 1; and then an execution process for the SQL statement is completed by using a syntax implementation shown in the following Table 1.

TABLE 1

Related content of construction statement for virtual column

| Syntax definition | Syntax implementation |
| --- | --- |
| ALTER TABLE t1 | Step 11: statement parsing. |
| ADD VIRTUAL COLUMNS | Step 12: verifying the statement. |
| (c int as (a + 1) COMMENT 'a + 1') | Step 13: executing the statement. |

For the SQL statement shown in the 2nd row and 1st column in the above Table 1, the string "t1" refers to a name of a data table to which a virtual column needs to be added; the character "c" refers to a column name of the virtual column; the string "int" refers to a data type of the virtual column; and the string "a+1" refers to an expression represented by the virtual column. It can be seen that when a regular column with a as a column name (a regular column a for short hereinafter) already exists in the data table t1, the SQL statement shown in the 2nd row and 1st column in the above Table 1 is mainly used for expressing: adding a virtual column to the data table t1 (i.e., the data table with the string "t1" as the table name); the virtual column c is used for representing the expression "a+1"; and the data type of the virtual column c is int, such that the virtual column c can represent an expression related to the regular column a. It can be seen that each virtual column and the data column (e.g., the regular column a) involved in the expression of the virtual column belong to the same data table. The regular column refers to a data column with a data recording function in a certain data table.

For the step 11 in the above Table 1, the embodiment of the present application does not limit the implementation of the step 11, for example, the implementation can be made by using any statement parsing method that is present or will appear in the future. For another example, the step 11 may specifically include: after a written lexical file (e.g., the SQL statement shown in the 2nd row and 1st column in the above Table 1) is acquired, parsing processing (e.g., converting one SQL statement into a syntax tree, etc.) may be performed on the lexical file by using a pre-constructed SQL parser, to obtain a parsing processing result. It should be noted that the embodiment of the present application does not limit the SQL parser, for example, it may be generated by means of JavaCC.

For the step 12 in the above Table 1, the embodiment of the present application does not limit the implementation of the step 12, for example, the implementation can be made by using any statement verification method that is present or will appear in the future. For another example, the step 12 may specifically include: after the above parsing processing result is acquired, validity of the column name, the type, and the expression may be verified for the parsing processing result.

It should be noted that, for the statement verification process shown in the step 12, it can not only verify the validity of some information, but also convert some invalid information in the above parsing processing result into valid information by using a pre-constructed type conversion rule (for example, rules such as if it is determined that the column name of the virtual column already occurs in a column name of at least one existing data column in the data table to which the virtual column belongs, one number may be added at an end of the column name of the virtual column such that the number can distinguish the virtual column from such existing data column, and so on), so that adverse effects caused by the existence of the invalid information can be effectively avoided.

For the step 13 in the above Table 1, the embodiment of the present application does not limit the implementation of the step 13, for example, the implementation may be made by using any statement execution method that is present or will appear in the future. For another example, the step 13 may specifically include: after the statement verification processing for the above parsing processing result is completed, extracting related information (e.g., the column name, the data type, the expression, the comment, etc.) of the virtual column from the parsing processing result first; and then, adding the virtual column to the data table (for example, the data table with the string "t1" as the table name) to which the virtual column belongs, and storing the related information of the virtual column as metadata information of the virtual column to a metadata service (HiveMetaStore), such that the related information of the virtual column can be searched for from the metadata service in the future.

In addition, the embodiment of the present application does not limit a storage mode of the "related information of the virtual column", for example, when the "related information of the virtual column" includes a column name (name) of the virtual column, an expression (expression) of the virtual column, a data type (type) of the virtual column, and a comment (comment) of the virtual column, it is possible to store all the column name of the virtual column, the expression of the virtual column, the data type of the virtual column, and the comment of the virtual column into metadata of the HiveMetaStore.

In addition, for the HiveMetaStore, it usually performs data storage by means of a key-value pair; and it has a character length limit for storage of a single key-value pair. However, since the expression may exceed the character length limit, in order to meet the storage requirement, the embodiment of the present application further provides one possible implementation of a storage mode of the above expression of the virtual column, which may specifically be: if it is determined that the expression of the virtual column exceeds the character length limit, by referring to the character length limit, dividing the expression of the virtual column into a plurality of sub-expressions (for example, a 1st sub-expression to an R-th sub-expression shown in FIG. 1) for storage, such that these sub-expressions all conform to the character length limit. R is a positive integer.

It should be noted that, since many virtual columns may exist in one data table (for example, the data table with the string "t1" as the table name), in order to better store and query related information of these virtual columns in the HiveMetaStore, one number (for example, the number "1" shown in an area 101 in FIG. 1) may be given to each virtual column, to enable the number to uniquely identify the virtual column, such that the related information of the virtual column can be queried from the HiveMetaStore according to the number in the future. In addition, for one data table, every time a virtual column is newly added in the data table, 1 is added to a current maximum number corresponding to the data table to obtain a number of the newly added virtual column.

It should also be noted that, in the HiveMetaStore, it is also agreed that only the virtual column can be prefixed with a string "virtual.", to enable the string "virtual." to be used to identify the virtual column, such that it can be determined which content in the HiveMetaStore is metadata of the virtual column and which content is not the metadata of the virtual column based on the string "virtual." in the future.

It should also be noted that, the purpose of the above step "adding the virtual column to the data table (for example, the data table with the string "t1" as the table name) to which the virtual column belongs" is: to shield a data lake's data usage party's usage difference with respect to the regular column and the virtual column, so that the user data query experience can be effectively improved.

(2) Related content of a deletion statement for a virtual column: as shown in the following Table 2, for a certain virtual column (e.g., a virtual column with "c" as a column name), an SQL statement (e.g., an SQL statement shown in a 2nd row and 1st column in the following Table 2) for deleting the virtual column may be generated by using a syntax definition shown in the following Table 2; and then an execution process for the SQL statement is completed by using a syntax implementation shown in the following Table 2.

TABLE 2

Related content of deletion statement for virtual column

| Syntax definition | Syntax implementation |
|---|---|
| ALTER TABLE t1 DROP VIRTUAL COLUMNS [IF EXISTS] (c) | Step 21: statement parsing. Step 22: verifying the statement. Step 23: executing the statement. |

For the SQL statement shown in the 2nd row and 1st column in the above Table 2, the string "t1" refers to a table name of a data table whose virtual column needs to be deleted; and the character "c" refers to a column name of the virtual column.

For the step 21 in the above Table 2, the embodiment of the present application does not limit the implementation of the step 21, for example, the implementation may be made by using any statement parsing method that is present or will appear in the future. For another example, the step 21 may specifically include: after a written lexical file (e.g., the SQL statement shown in the 2nd row and 1st column in the above Table 2) is acquired, performing parsing processing (e.g., converting one SQL statement into a syntax tree, etc.) on the lexical file by using a pre-constructed SQL parser, to obtain a parsing processing result.

For the step 22 in the above Table 2, the embodiment of the present application does not limit the implementation of the step 22, for example, the implementation may be made by using any statement verification method that is present or will appear in the future. For another example, the step 22 may specifically include: after the above parsing processing result is obtained, it may be verified whether a table (for example, the data table with the string of "t1" as the table name) and a virtual column to be deleted (for example, the virtual column with the character of "c" as the column name) exist. It should be noted that for the existence of the column, the verification may be skipped by means of the string "IF EXISTS" in the Table 2, that is, if the virtual column c does not exist in the data table t1, the problem may be ignored by means of the string "IF EXISTS".

For the step 23 in the above Table 2, the embodiment of the present application does not limit the implementation of the step 23, for example, the implementation may be made by using any statement execution method that is present or will appear in the future. For another example, the step 23 may specifically include: after the statement verification processing for the above parsing processing result is completed, first, extracting a table name and a column name from the parsing processing result; then, searching for a number corresponding to the column name from the number mapping relation corresponding to the table name (for example, the number "1" shown in the area 101 in FIG. 1); and finally, deleting all key-value pairs under the number (for example, content shown in an area 100 in FIG. 1), and deleting a data column with the column name from the data table with the table name. The number mapping relation is used for recording the correspondence between each virtual column and the number corresponding to each virtual column in the data table with the table name.

(3) Related content of a view statement for a virtual column: as shown in the following Table 3, for a certain data table (for example, the data table with the string "t1" as the table name), an SQL statement (for example, an SQL statement shown in a 2nd row and 1st column in the following Table 3) for viewing all virtual columns under the data table may be generated by using a syntax definition shown in the following Table 3; and then an execution process for the SQL statement is completed by using a syntax implementation shown in the following Table 3.

TABLE 3

Related content of view statement for virtual column

| Syntax definition | Syntax implementation |
|---|---|
| SHOW VIRTUAL COLUMNS FROM t1 | Step 31: statement parsing. Step 32: verifying the statement. Step 33: executing the statement. |

For the SQL statement shown in the 2nd row and 1st column of the above Table 3, the string "t1" refers to a table name of a data table whose virtual column needs to be deleted.

For the step 31 in the above Table 3, the embodiment of the present application does not limit the implementation of the step 31, for example, the implementation may be made by using any statement parsing method that is present or will appear in the future. For another example, the step 31 may specifically include: after a written lexical file (e.g., the SQL statement shown in the 2nd row and 1st column in the above Table 3) is acquired, performing parsing processing (e.g., converting one SQL statement into a syntax tree, etc.) on the lexical file by using a pre-constructed SQL parser, to obtain a parsing processing result.

For the step 32 in the above Table 3, the embodiment of the present application does not limit the implementation of the step 32, for example, the implementation may be made by using any statement verification method that is present or will appear in the future. For another example, the step 32 may specifically include: after the above parsing processing result is acquired, it may be verified whether a table (for example, the data table with the string "t1" as the table name) exists for the parsing processing result.

For the step 33 in the above Table 3, the embodiment of the present application does not limit the implementation of the step 33, for example, the implementation may be made by using any statement execution method that is present or will appear in the future. For another example, the step 33 may specifically include: after the statement verification processing for the above parsing processing result is completed, first, the table name may be extracted from the parsing processing result; next, according to the table name, searching for related information (such as a name, an expression, a type, a comment, and the like) of respective virtual columns under the table name from the HiveMeta-Store; then, aggregating the related information of respective virtual columns according to the numbers to obtain information sets of respective virtual columns; and finally, performing sequencing presentation on the information sets of these virtual columns according to the numbers to obtain a virtual column view result under the table name. An information set of a d-th virtual column includes a column name of the d-th virtual column, a data type of the d-th virtual column, and an expression of the d-th virtual column. d is a positive integer, d≤D, D is a positive integer, and D represents the number of the virtual columns in the data table with the table name.

(4) Related content of a usage statement (i.e., a query statement) for a virtual column: as shown in the following Table 4, for a certain virtual column (e.g., the virtual column c in the data table t1), an SQL statement (e.g., an SQL statement shown in a 2nd row and 1st column in the following Table 4) for performing a data query on the virtual column may be generated by using a syntax definition shown in the following Table 4, such that the SQL statement can represent a requirement for performing a data query on the virtual column; and then an execution process for the SQL statement is completed by using a syntax implementation shown in the following Table 4.

For the SQL statement shown in the 2nd row and 1st column in the following Table 4, a string "t1" refers to a table name of the data table whose virtual column needs to be deleted; a character "c" refers to a column name of the virtual column.

TABLE 4

| Related content of usage statement for virtual column | |
| --- | --- |
| Syntax definition | Syntax implementation |
| SELECT c FROM t1 | Step 41: verifying the statement.<br>Step 42: converting the statement.<br>Step 43: executing the statement. |

For the step 41 in the above Table 4, the embodiment of the present application does not limit the implementation of the step 41, for example, the implementation may be made by using any statement verification method that is present or will appear in the future. For another example, the step 41 may specifically include: after a written lexical file (e.g., the SQL statement shown in the 2nd row and 1st column in the above Table 4) is acquired, performing validity verification (e.g., verifying whether the virtual column c exists in the data table t1, etc.) on the lexical file.

For the step 42 in the above Table 4, the embodiment of the present application does not limit the implementation of the step 42, for example, the implementation may be made by using any statement adjustment method that is present or will appear in the future. For another example, the step 42 may specifically include: after the statement verification processing for the above lexical file is completed, replacing the column name of the virtual column in the lexical file with the expression of the virtual column to obtain a replaced file; and then, translating the replaced file into executable plans corresponding to different engines respectively according to translation rules corresponding to the different engines, such that the different engines can complete a query task for the virtual column subsequently by executing their corresponding executable plans.

For the step 43 in the above Table 4, the embodiment of the present application does not limit the implementation of step 43, for example, the implementation may be made by using any statement execution method that is present or will appear in the future. For another example, the step 43 may specifically include: after an executable plan corresponding to a certain engine is obtained, sending the executable plan to the engine, to enable the engine to complete a query task for the virtual column by executing the executable plan.

Based on the above related content of the virtual column, it can be seen that for a virtual column provided by the present application, when the virtual column belongs to a certain data table, the virtual column can represent one expression related to a certain regular column in the data table, such that a query task for the expression can be implemented by means of a query task for the virtual column in the future. In addition, although a constructed virtual column may occur in a data table, the virtual column in the data table is not generally used for recording data, such that when a data query request is triggered for the virtual column in the future, the data in the virtual column is not directly read from the data table, but a data query result for the virtual column is determined by means of the expression of the virtual column.

In fact, for the above SQL statement for constructing the virtual column, it may be input by manual editing or determined automatically. Based on this, the embodiments of the present application further provide some automatic generation solutions of the SQL statement for constructing the virtual column (i.e., some possible implementations of the virtual column construction method based on a data lake), which will be described below with reference to the accompanying drawings for ease of understanding.

Automatic Construction Process of Virtual Column

As shown in FIG. 2, a virtual column construction method based on a data lake provided by an embodiment of the present application comprises steps S201 to S204:

S201: determining an expression to be used from at least one statement to be analyzed, after acquiring the at least one statement to be analyzed.

The above "at least one statement to be analyzed" refers to some SQL statements collected from all engines (e.g., MySQL, Hive, Spark, Presto, and other engines) corresponding to a data lake. For example, for a data lake scenario, if a data processing task for the data lake can be performed by H engines, the above "at least one statement to be analyzed" refers to some SQL statements collected from the H engines. H is a positive integer.

In addition, the embodiment of the present application does not limit an acquisition mode of the above "at least one statement to be analyzed", for example, it may specifically be: after a h-th engine receives an SQL statement, the h-th engine may store the SQL statement in a preset storage space, such that after a preset statement analysis condition is met, the SQL statement stored by the engine is read from the preset storage space as a statement to be analyzed. h is a positive integer, h≤H, H is a positive integer, and H represents the number of engines corresponding to the data lake.

The above "statement analysis condition" may be preset, for example, it may specifically be: a time difference between a current time and a trigger time of a previous virtual column automatic construction process (e.g., S201-S204) reaching a preset time difference. It can be seen that based on the statement analysis condition, the purpose of automatically pulling a large number of SQL statements periodically and automatically analyzing expressions with the virtual column construction requirement from the large number of SQL statements can be achieved.

The above "expression to be used" refers to an expression which meets the preset virtual column construction condition, such that the expression to be used can represent the expression with the virtual column construction requirement. For example, the expression to be used may be an expression "a+1".

The above virtual column construction condition may be preset, for example, it may be: an occurrence frequency of the expression to be used being higher than a preset frequency threshold. The preset frequency threshold may be preset.

In addition, the embodiment of the present application does not limit the implementation of the S201, for example, when N statements to be analyzed exist in the above "at least one statement to be analyzed", the S201 may specifically comprise S2011-S2013:

S2011: determining a n-th expression to be analyzed from a n-th statement to be analyzed. n is a positive integer, n≤N, and N is a positive integer.

The n-th expression to be analyzed is used for representing semantic information carried by an expression involved in the n-th statement to be analyzed.

In addition, the embodiment of the present application does not limit a determination process of the n-th expression to be analyzed, for example, an expression that occurs in the n-th statement to be analyzed may be directly determined as the n-th expression to be analyzed.

In fact, for SQL statements under different engines, semantic expression is usually made by using different dialects, so that in order to better improve the statement analysis effect, these SQL statements may be converted into a same dialect first, and then the expression extraction may be performed on these SQL statements.

Based on this, an embodiment of the present application further provides another possible implementation of the process of determining the n-th expression to be analyzed, which may specifically comprise S20111-S20112:

S20111: performing syntax conversion processing on the n-th statement to be analyzed to obtain a syntax conversion result.

The syntax conversion processing is used for converting the n-th statement to be analyzed from a first dialect to a second dialect. The first dialect refers to a statement dialect used by the n-th statement to be analyzed. The second dialect refers to a target dialect.

The above "syntax conversion result" is used for expressing semantic information carried by the n-th statement to be analyzed according to the second dialect. For example, when the above n-th statement to be analyzed is an SQL statement shown in 301 in FIG. 3, the syntax conversion result may be an SQL statement shown in 302 in FIG. 3. It can be seen that semantic information carried by the SQL statement shown in 301 in FIG. 3 is the same as semantic information carried by the SQL statement shown in 302 in FIG. 3, but a statement dialect used by the SQL statement shown in 301 in FIG. 3 is different from a statement dialect used by the SQL statement shown in 302 in FIG. 3.

S20112: extracting the n-th expression to be analyzed from the syntax conversion result.

Figure 3:
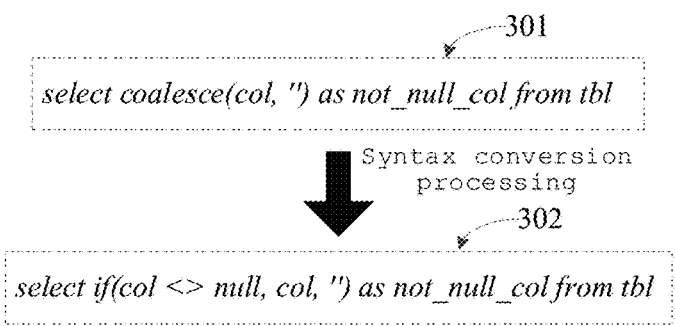
FIG. 3 is a schematic diagram of a syntax conversion provided by an embodiment of the present application.

In the embodiment of the present application, after the syntax conversion result (for example, the SQL statement shown in 302 in FIG. 3) corresponding to the n-th statement to be analyzed is acquired, an expression (for example, an expression "if (col < > null, col, ")" that occurs in the SQL statement shown in 302 in FIG. 3) that occurs in the syntax conversion result may be determined as the n-th expression to be analyzed.

Based on the related content of the above S2011, it can be seen that after the n-th statement to be analyzed is acquired, the n-th expression to be analyzed may be determined from the n-th statement to be analyzed, to enable the n-th expression to be analyzed to represent the semantic information carried by the expression in the n-th statement to be analyzed, such that it can be determined subsequently whether the n-th expression to be analyzed has a virtual column construction requirement.

S2012: performing statistical analysis processing on the N expressions to be analyzed to obtain an expression statistical result.

The expression statistical result is used for describing occurrence frequencies of different expressions in the N expressions to be analyzed. For example, when there are an expression 1, expression 2, . . . expression Y in the above N expressions to be analyzed, the expression statistical result may include the number of occurrences of the expression 1 in the N expressions to be analyzed, the number of occurrences of the expression 2 in the N expressions to be analyzed, . . . and the number of occurrences of the expression Y in the N expressions to be analyzed. Y is a positive integer.

In addition, the embodiment of the present application does not limit the implementation of the S2012, for example, the implementation may be made by using a method capable of performing statistical analysis processing on some expressions that is present or will appear in the future.

In fact, in the process of statistical analysis processing on the expressions to be analyzed, it is generally required to compare whether any two expressions to be analyzed are the same, so that in order to better identify the same expression, an embodiment of the present application further provides another possible implementation of the S2012, which may specifically comprise S20121-S20122:

S20121: performing syntax tree construction processing on the n-th expression to be analyzed to obtain a syntax tree of the n-th expression to be analyzed.

Figure 4:
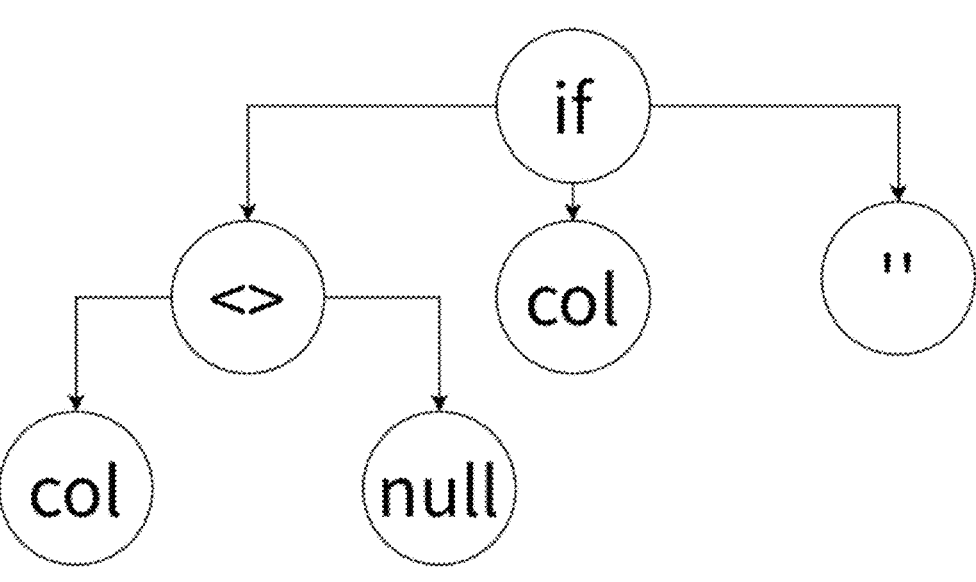
FIG. 4 is a schematic diagram of a syntax tree provided by an embodiment of the present application.

The syntax tree of the n-th expression to be analyzed is used for representing the semantic information carried by the n-th expression to be analyzed in a form of an abstract syntax tree. For example, when the above n-th expression to be analyzed is the expression "if (col < > null, col, ")", the syntax tree of the n-th expression to be analyzed may be a syntax tree shown in FIG. 4.

S20122: performing statistical analysis processing on syntax trees of the N expressions to be analyzed to obtain a statistical analysis result.

In the embodiment of the present application, after acquiring the syntax trees of the N expressions to be analyzed, it may first compare any two syntax trees in these syntax trees to obtain a comparison result, such that the comparison result can indicate whether the two syntax trees are equal; and then, determine a statistical analysis result of the N expressions to be analyzed by using the comparison result between the any two syntax trees in these syntax trees, such that the statistical analysis result can indicate occurrence frequencies of different expressions in the expressions to be analyzed.

It should be noted that the embodiment of the present application does not limit a determination process of the above "comparison result", for example, for any two syntax trees, it may be compared whether the two syntax trees are equal by using a recursive algorithm.

Based on the related content of the above S2012, it can be seen that after the N expressions to be analyzed are acquired, statistical analysis processing may be performed on these expressions to be analyzed to obtain an expression statistical result, to enable the expression statistical result to not only represent which different expressions occur in the expressions to be analyzed, but also represent an occurrence frequency of each expression, such that an expression with the virtual column construction requirement may be determined based on the expression statistical result subsequently.

S2013: if the expression statistical result indicates that an occurrence frequency of a first expression in the N expressions to be analyzed is higher than a preset frequency threshold, determining the first expression as the expression to be used.

The first expression refers to an expression to be analyzed whose occurrence frequency is higher than the preset frequency threshold. For example, the first expression may be the expression "if (col < > null, col, ")".

In addition, the embodiment of the present application does not limit the determination process of the first expression, for example, when the above "expression statistical result" includes the number of occurrences of the expression 1 in the N expressions to be analyzed, the number of occurrences of the expression 2 in the N expressions to be analyzed, . . . , and the number of occurrences of the expression Y in the N expressions to be analyzed, it may be determined whether the number of occurrences of an expression y in the N expressions to be analyzed is higher than the preset frequency threshold, and if it is higher than the preset frequency threshold, the expression y may be determined as the first expression. y is a positive integer, and y≤Y.

Based on the related content of the S2013, it can be seen that after the above expression statistical result corresponding to the N expressions to be analyzed is acquired, the first expression whose occurrence frequency is higher than the preset frequency threshold may be determined from the N expressions to be analyzed based on the expression statistical result, as the expression to be used.

Based on the related content of the above S201, it can be seen that for the data lake scenario, after some statements to be analyzed are acquired from a large number of engines corresponding to the data lake, an expressions that meet a preset virtual column construction condition may be determined from these statements to be analyzed, as the expression to be used, such that automatic virtual column construction processing can be subsequently performed on these expressions that meet the preset virtual column construction condition.

S202: determining virtual column construction description information corresponding to the expression to be used.

The virtual column construction description information corresponding to the expression to be used is used for describing content to be referred (for example, a column name of a virtual column, a data type of the virtual column, an expression of the virtual column, a table name of a data table to which the virtual column belongs, and the like) when the virtual column corresponding to the expression to be used is constructed.

In addition, the embodiment of the present application does not limit the above "virtual column construction description information corresponding to the expression to be used", for example, it may include a column name of a virtual column, a data type of the virtual column, an expression of the virtual column, and a table name of a data table to which the virtual column belongs. The virtual column refers to a data column for representing the expression to be used.

The above "column name of a virtual column" (that is, a column name corresponding to an expression to be used) refers to a name identification of a virtual column for representing the expression to be used. For example, when the expression to be used is the expression "if (col < > null, col, ")" in 302 in FIG. 3, the name identification of the virtual column for representing the expression to be used may be the string "not_null_col" in 302 in FIG. 3.

In addition, the embodiment of the present application does not limit a determination process of the above "column name of a virtual column", for example, it may specifically comprise steps 51 to 54:

step 51: determining whether a statement to be referred that meets a preset statement reference condition exists in the above at least one statement to be analyzed, if it exists, performing step 52; if it does not exist, performing steps 53-54.

The statement to be referred refers to a statement to be analyzed that meets the preset statement reference condition; and the statement reference condition is used for screening, from the above at least one statement to be analyzed, content related to the column name corresponding to the expression to be used, and the embodiment of the present application does not limit the statement reference condition, for example, it may specifically be: a preset semantic identity condition is met between an expression carried by the statement to be referred and the expression to be used; and the statement to be referred comprises a column name corresponding to the expression carried by the statement to be referred.

It can be seen that, for the n-th statement to be analyzed (for example, the SQL statement shown in 301 in FIG. 3), first, it may be determined whether a preset semantic identity condition is met between an expression (for example, an expression "coalesce (col, ")" in the SQL statement shown in 301 in FIG. 3) carried by the n-th statement to be analyzed and the expression to be used (for example, the expression "if (col < > null, col, ")"), if the condition is met, it may be determined that semantic information of the expression carried by the n-th statement to be analyzed is identical to that of the expression to be used, and then it is determined whether a column name (for example, a string "not-_null_col" in the SQL statement shown in 301 in FIG. 3) corresponding to the expression carried by the statement to be referred exists in the n-th statement to be analyzed, and if the column name exists, the n-th statement to be analyzed may be determined as the statement to be referred, such that a column name corresponding to the expression to be used can be determined based on the column name occurring in the n-th statement to be analyzed subsequently. n is a positive integer, n≤N, and N is a positive integer.

It should be noted that the above "preset semantic identity condition" may be preset, for example, it may specifically be: the semantic information of the expression carried by the n-th statement to be analyzed is identical to that of the expression to be used.

Step 52: determining a column name corresponding to the expression to be used from at least one statement to be referred.

As an example, the step 52 may specifically comprise steps 521-522:

step 521: performing statistical analysis processing on column names corresponding to expressions carried by the at least one statement to be referred to obtain a column name statistical result.

A column name corresponding to an expressions carried by a j-th statement to be referred refers to a column name corresponding to the expression carried by the j-th statement to be referred that exists in the j-th statement to be referred. For example, when the j-th statement to be referred is the SQL statement shown in 301 in FIG. 3, and the expression carried by the j-th statement to be referred is the expression "coalesce(col, ")" in the SQL statement shown in 301 in FIG. 3, since a column name "not_null_col" exists in the j-th statement to be referred, and the column name "not_null_col" corresponds to the expression carried by the j-th statement to be referred, the column name "not_null_col" may be determined as the column name corresponding to the expression carried by the j-th statement to be referred. j is a positive integer, j≤J, J is a positive integer, and J represents the number of the statement to be referred.

The above column name statistical result is used for indicating occurrence frequencies of different names in the above "column names corresponding to expressions carried by the at least one statement to be referred". For example, when there are a column name 1, column name 2, column name 3, . . . , and column name H in the above "column names corresponding to expressions carried by the at least one statement to be referred", the column name statistical result may include the number of occurrences of the column name 1 in the above "column names corresponding to expressions carried by the at least one statement to be referred", the number of occurrences of the column name 2 in the above "column names corresponding to expressions carried by the at least one statement to be referred", the number of occurrences of the column name 3 in the above "column names corresponding to expressions carried by the at least one statement to be referred", . . . , and the number of occurrences of column name H in the above "column names corresponding to expressions carried by the at least one statement to be referred". H is a positive integer.

Step 522: determining the column name corresponding to the expression to be used according to the column name statistical result.

In the embodiment of the present application, after the column name statistical result is acquired, according to the column name statistical result, a column name with a highest occurrence frequency may be determined from the above "column names corresponding to expressions carried by the at least one statement to be referred", as the column name corresponding to the expression to be used.

In addition, the embodiment of the present application does not limit the implementation of the step 522, for example, when the above "column names corresponding to expressions carried by the at least one statement to be referred" includes a target column name, the step 522 may specifically be: if the column name statistical result indicates that an occurrence frequency of the target column name meets a preset frequency condition, determining the target column name as the column name corresponding to the expression to be used. The preset frequency condition may be preset, for example, it may specifically be: the occurrence frequency of the target column name is higher than occurrence frequencies of the column names other than the target column name in the above "column names corresponding to expressions carried by the at least one statement to be referred".

Based on the related content of the above step 52, if it is determined that at least one statement to be referred exists in the above at least one statement to be analyzed, it may be determined that these statements to be referred can provide some available column names for the expression to be used, and therefore, a column name with a highest occurrence frequency may be screened from these statements to be referred, as the column name corresponding to the expression to be used, such that the column name corresponding to the expression to be used can be subsequently used as the column name of the virtual column for representing the expression to be used.

Step 53: determining a second expression from at least one expression to be matched which is preset according to similarity representation data between the at least one expression to be matched and the expression to be used. Similarity representation data between the second expression and the expression to be used meets a preset similarity condition.

Figure 5:
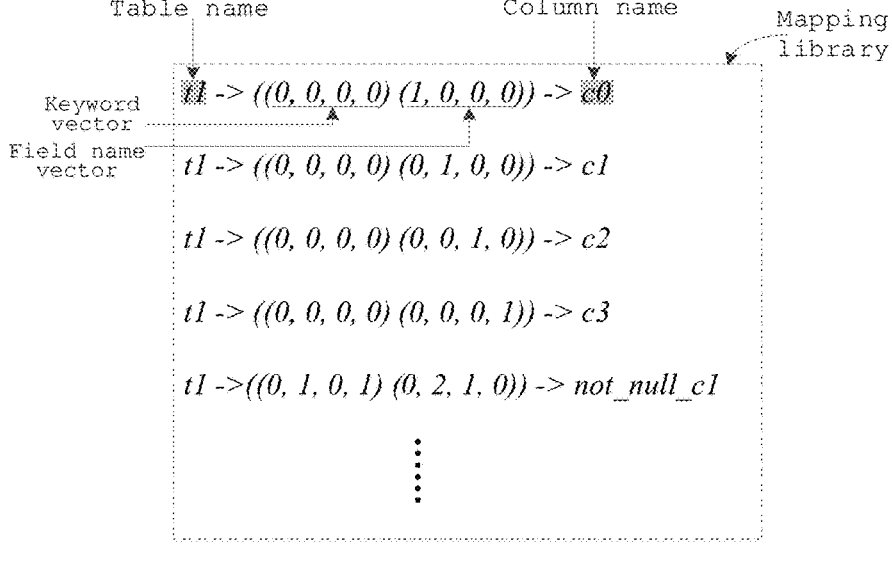
FIG. 5 is a schematic diagram of a mapping library provided by an embodiment of the present application.

An m-th expression to be matched refers to a preset expression with a column name of a virtual column. m is a positive integer, m≤M, M is a positive integer, and M represents the number of the expression to be matched. For example, the m-th expression to be matched can be an expression corresponding to a column name c0 in a mapping library shown in FIG. 5.

In addition, the embodiment of the present application does not limit an acquisition process of the above "at least one expression to be matched", for example, the expressions corresponding to respective column names in the pre-constructed mapping library all may be determined as the expression to be matched.

In addition, similarity representation data between the m-th expression to be matched and the expression to be used is used for representing a similarity between the m-th expression to be matched and the expression to be used; and the embodiment of the present application does not limit a determination process of the "similar representation data between the m-th expression to be matched and the expression to be used", for example, it may specifically comprise steps 61 to 62:

step 61: determining a field name vector and a keyword vector of the expression to be used.

The field name vector of the expression to be used is used for representing a field name carried by the expression to be used; and the embodiment of the present application does not limit a determination process of the "field name vector of the expression to be used", for example, it may specifically comprise steps 611 to 612:

step 611: performing field name extraction processing on the expression to be used to obtain a field name extraction result of the expression to be used.

The field name extraction result of the expression to be used is used for describing the field name carried by the expression to be used. For example, when the expression to be used is an expression "if (c1 < > null, c1, c2)")", a field name extraction result of the expression to be used may be {c1,c2}.

Step 612: performing vectorizing processing on the field name extraction result of the expression to be used to obtain the field name vector of the expression to be used.

In the embodiment of the present application, after the field name extraction result of the expression to be used is acquired, the vectorizing processing may be performed on the field name extraction result of the expression to be used by using a pre-constructed field name dictionary (for example, a dictionary {c0, c1, c2, c3}), to obtain a field name vector (for example, a vector (0, 2, 1, 0)) of the expression to be used.

It should be noted that, for the above vector (0, 2, 1, 0), a first "0" in the vector indicates that a field name c0 does not occur in the expression to be used; "2" in the vector indicates that a field name c1 occurs twice in the expression to be used; "1" in the vector indicates that a field name c2 occurs once in the expression to be used; and a second "0" in the vector indicates that a field name c3 does not occur in the expression to be used.

It should be noted that, the embodiment of the present application does not limit the above "field name dictionary", for example, in some scenarios, if different data tables correspond to different field name dictionaries, the determination process of the above "field name dictionary" may specifically be: searching for, from a first mapping relation, a field name dictionary having a correspondence with the data table corresponding to the expression to be used, to determine the field name dictionary as the above "field name dictionary". The data table corresponding to the expression to be used refers to a data table to which the virtual column for representing the expression to be used belongs.

Based on the related content of the above steps 611 to 612, after the expression to be used is acquired, first, field name extraction processing may be performed on the expression to be used to obtain a field name extraction result of the expression to be used; and then, by means of a pre-constructed field name dictionary, field name statistical analysis processing is performed on the field name extraction result of the expression to be used to obtain a field name vector of the expression to be used, such that the field name vector of the expression to be used can represent which field names occur in the expression to be used and what occurrence frequencies of respective field names are.

The keyword vector of the expression to be used is used for representing a keyword carried by the expression to be used; and the embodiment of the present application does not limit a determination process of the "keyword vector of the expression to be used", for example, it may specifically comprise steps 613 to 614:

step 613: performing keyword extraction processing on the expression to be used to obtain a keyword extraction result of the expression to be used.

The keyword extraction result of the expression to be used is used for describing a keyword carried by the expression to be used. For example, when the expression to be used is an expression "if (c1 < > null, c1, c2)")", a keyword extraction result of the expression to be used may be {if, null}.

It should be noted that, the embodiment of the present application does not limit the execution order between the steps 611 and 613, for example, the steps 611 and 613 may be executed sequentially. For another example, the steps 613 and 611 may be executed. For still another example, the steps 611 and 613 may be performed simultaneously.

Step 614: performing vectorizing processing on the keyword extraction result of the expression to be used to obtain the keyword vector of the expression to be used.

In the embodiment of the present application, after the keyword extraction result of the expression to be used is acquired, vectorizing processing may be performed on the keyword extraction result of the expression to be used by using a pre-constructed keyword dictionary (for example, a dictionary {as, if, in, null}), to obtain the keyword vector (for example, a vector (0, 1, 0, 1)) of the expression to be used.

It should be noted that, for the above vector (0, 1, 0, 1), a first "0" in the vector indicates that a keyword "as" does not occur in the expression to be used; a first "1" in the vector indicates that a keyword "if" occurs once in the expression to be used; a second "0" in the vector indicates that a keyword "in" does not occur in the expression to be used; and a second "1" in the vector indicates that a keyword "null" occurs once in the expression to be used.

It should be noted that the embodiment of the present application does not limit the above "keyword dictionary", for example, it may be preset.

Based on the related content of the above steps 613 to 614, it can be seen that after the expression to be used is acquired, first, keyword extraction processing may be performed on the expression to be used to obtain a keyword extraction result of the expression to be used; and then, by means of a pre-constructed keyword dictionary, keyword statistical analysis processing is performed on the keyword extraction result of the expression to be used to obtain a keyword vector of the expression to be used, such that the keyword vector of the expression to be used can indicate which keywords occur in the expression to be used and what occurrence frequencies of respective keywords are.

Based on the related content of the above step 61, after the expression to be used is acquired, the field name vector extraction processing and the keyword vector extraction processing may be performed on the expression to be used, to obtain the field name vector and the keyword vector of the expression to be used, such that these vectors may indicate semantic information carried by the expression to be used.

Step 62: determining the similarity representation data between the m-th expression to be matched and the expression to be used, according to a similarity between the field name vector of the expression to be used and a field name vector of the m-th expression to be matched and a similarity between the keyword vector of the expression to be used and a keyword vector of the m-th expression to be matched.

The above "similarity between the field name vector of the expression to be used and a field name vector of the m-th expression to be matched" is used for representing a level of similarity presented on the field names between the expression to be used and the m-th expression to be matched; and the embodiment of the present application does not limit the determination process of the "similarity between the field name vector of the expression to be used and a field name vector of the m-th expression to be matched", for example, an Euclidean distance between the field name vector of the expression to be used and the field name vector of the m-th expression to be matched may be determined, as the similarity between the field name vector of the expression to be used and the field name vector of the m-th expression to be matched.

The above "similarity between the keyword vector of the expression to be used and a keyword vector of the m-th expression to be matched" is used for representing a level of similarity presented on the keywords between the expression to be used and the m-th expression to be matched; and the embodiment of the present application does not limit the determination process of the "similarity between the keyword vector of the expression to be used and a keyword vector of the m-th expression to be matched", for example, an Euclidean distance between the keyword vector of the expression to be used and the keyword vector of the m-th expression to be matched may be determined, as the similarity between the keyword vector of the expression to be used and the keyword vector of the m-th expression to be matched.

In addition, the embodiment of the present application does not limit the implementation of the step 62, for example, it may specifically be: according to a preset weight, performing weighted summation on the similarity between the field name vector of the expression to be used and the field name vector of the m-th expression to be matched and the similarity between the keyword vector of the expression to be used and the keyword vector of the m-th expression to be matched, to obtain the similarity representation data between the m-th expression to be matched and the expression to be used.

It should be noted that, the embodiment of the present application does not limit the above "weight", for example, a weight corresponding to the above "similarity between the field name vector of the expression to be used and a field name vector of the m-th expression to be matched" is 0.75, and a weight corresponding to the above "similarity between the keyword vector of the expression to be used and a keyword vector of the m-th expression to be matched" is 0.25.

Based on the related content of the above steps 61 to 62, it can be seen that after the expression to be used is acquired, first, the field name vector and the keyword vector of the expression to be used may be determined; and then, similarity representation data between the m-th expression to be matched and the expression to be used is calculated according to the field name vector and the keyword vector of the expression to be used and the field name vector and the keyword vector of the m-th expression to be matched, such that the similarity representation data can represent a level of similarity between the m-th expression to be matched and the expression to be used. m is a positive integer, m≤M, M is a positive integer, and M represents the number of the expression to be matched.

The above "second expression" refers to an expression to be matched whose similarity representation data with the expression to be used meets a preset similarity condition. The preset similarity condition can be preset, for example, if the above similarity representation data is determined by means of the Euclidean distance, the preset similarity condition may specifically be: the similarity representation data between the second expression and the expression to be used is less than similarity representation data between each other expression to be matched than the second expression in the above "at least one expression to be matched" and the expression to be used. That is, the similarity representation data between the second expression in the above "at least one expression to be matched" and the expression to be used is the smallest.

Based on the related content of the above step 53, it can be seen that if it is determined that the statement to be referred does not exist in the above at least one statement to be analyzed, it may be determined that these statements to be analyzed cannot provide some available column names for the expression to be used, and therefore, by using similarity representation data between some expressions to be matched and the expression to be used that is recorded in the mapping library, a second expression most similar to the expression to be used can be determined from these expressions to be matched, such that the column name corresponding to the expression to be used can be inferred subsequently by using a column name corresponding to the second expression.

Step 54: searching for a column name corresponding to the second expression from the pre-constructed mapping relation, and determining the column name corresponding to the expression to be used according to the column name corresponding to the second expression.

The mapping relation is used for recording a correspondence between respective expressions to be matched and column names corresponding to the respective expressions to be matched.

In addition, the embodiment of the present application does not limit the implementation of the step 54, for example, it may specifically be: directly determining the column name corresponding to the second expression that is found from the pre-constructed mapping relation as the column name corresponding to the expression to be used.

In fact, to avoid the occurrence of duplicate names, the embodiment of the present application further provides another possible implementation of the step 54, which may specifically be: after the column name corresponding to the second expression is found from the pre-constructed mapping relation, determining whether existing column names comprising the column name corresponding to the second expression exists in the data table corresponding to the expression to be used, and if so, determining the column name corresponding to the expression to be used according to the column name corresponding to the second expression and the number of the existing column names comprising the column name corresponding to the second expression, such that the column name corresponding to the expression to be used is different from respective existing column names comprising the column name corresponding to the second expression in the data table.

In addition, the embodiment of the present application does not limit the implementation of the above step "determining the column name corresponding to the expression to be used according to the column name corresponding to the second expression and the number of the existing column names comprising the column name corresponding to the second expression", for example, the implementation may specifically be: first, adding 1 to the number of the existing column names comprising the column name corresponding to the second expression to obtain a number to be used; and then adding the number to be used to an end of the column name corresponding to the second expression to obtain the column name corresponding to the expression to be used.

Based on the related content of the above step 54, it can be seen that after it is determined that the second expression in the above "at least one expression to be matched" is most similar to the expression to be used, the column name corresponding to the expression to be used can be inferred by using the column name corresponding to the second expression.

Based on the related content of the above steps 51 to 54, it can be seen that after the expression to be used is acquired, if it is determined that the virtual column name corresponding to the expression to be used is given in the above at least one statement to be analyzed, the column name corresponding to the expression to be used may be extracted from these statements to be analyzed; however, if the virtual column name corresponding to the expression to be used is not mentioned in these statements to be analyzed, the column name corresponding to the expression to be used may be inferred by means of the column names corresponding to some expressions to be matched which already exist in the mapping library.

It should be noted that after the column name corresponding to the expression to be used is acquired, the above mapping library may be updated by using the correspondence between the expression to be used, the field name vector and the keyword vector of the expression to be used, and the column name corresponding to the expression to be used, to improve the accuracy of the mapping library.

Based on the related content of the above "column name of a virtual column" (i.e., the column name corresponding to the expression to be used), it can be seen that in some application scenarios, the column name of the virtual column for representing the expression to be used may be automatically analyzed, thereby helping to reduce the workload of the user.

The above "data type of the virtual column" (i.e., the data type corresponding to the expression is to be used) refers to the data type of the virtual column for representing the expression to be used.

In addition, the embodiment of the present application does not limit a determination process of the above "data type of the virtual column" (i.e., the data type corresponding to the expression to be used), for example, it may be manually set.

In fact, a data type of one virtual column is related to a data type of an existing data column involved in an expression represented by the virtual column. Based on this, the embodiment of the present application further provides one possible implementation of the determination process of the above "data type of the virtual column" (i.e., the data type corresponding to the expression to be used), which may specifically be: determining a data type corresponding to the expression to be used according to a data type corresponding to the column name carried by the expression to be used.

It should be noted that the embodiment of the present application does not limit the implementation of the above step "determining a data type corresponding to the expression to be used according to a data type corresponding to the column name carried by the expression to be used", for example, when the expression to be used is an expression "a+1", the implementation may specifically be: directly determining the data type (e.g., int) corresponding to the column name (i.e., a character "a") carried by the expression to be used as the data type (e.g., int) corresponding to the expression to be used. For another example, the implementation may also be: according to a pre-defined data type inference rule, inferring the data type corresponding to the expression to be used from the data type corresponding to the column name carried by the expression to be used.

The above "expression of the virtual column" refers to an expression represented by the virtual column. For example, for the virtual column for representing the expression to be used, the expression of the virtual column is the expression to be used.

The above "table name of a data table to which the virtual column belongs" (i.e., a table name corresponding to the expression to be used) refers to a table name of a data table to which the virtual column for representing the expression to be used belongs; and the embodiment of the present application does not limit a determination process of the "table name of the data table to which the virtual column belongs", for example, it may specifically be: determining a table name carried by a target statement in the above "at least one statement to be analyzed" as the table name corresponding to the expression to be used. The preset semantic identity condition is met between an expression carried in the target statement and the expression to be used; and the target statement carries the table name.

Based on the related content of the above S202, it can be seen that after the expression to be used is acquired, the virtual column construction description information corresponding to the expression to be used may be acquired, such that the virtual column construction description information can describe content (for example, a column name of a virtual column, a data type of the virtual column, an expression of the virtual column, a table name of a data table to which the virtual column belongs, and the like) to be referred when the virtual column corresponding to the expression to be used is constructed, such that the virtual column corresponding to the expression to be used can be subsequently constructed by using the virtual column construction description information.

S203: generating a virtual column construction request, according to the virtual column construction description information corresponding to the expression to be used.

The virtual column construction request is used for requesting to generate a virtual column for representing the expression to be used; and the embodiment of the present application does not limit the implementation of the virtual column construction request, for example, when the virtual column construction description information corresponding to the expression to be used includes {(column name, c), (expression, a+1), (data type, int), (data table, t1)}, the virtual column construction request may be the SQL statement shown in the 2nd row and 1st column in the above Table 1.

S204: constructing a virtual column corresponding to the expression to be used, according to the virtual column construction request.

In the embodiment of the present application, after a virtual column construction request is acquired, it may first generate an executable task corresponding to a first engine according to the virtual column construction request; and then send the executable task corresponding to the first engine to the first engine, such that the first engine constructs a virtual column corresponding to the expression to be used by executing the executable task. The first engine refers to an execution engine for constructing the virtual column corresponding to the expression to be used; and the embodiment of the present application does not limit the first engine, for example, it may be an engine specified by a user, or an execution engine selected based on a current resource condition.

It should be noted that, the embodiment of the present application does not limit the generation process of the above "executable task corresponding to a first engine", for example, it may specifically be: after the virtual column construction request is acquired, translating the virtual column construction request into the executable task corresponding to the first engine according to a translation rule corresponding to the first engine.

Based on the related content of the above S201 to S204, it can be seen that, for the virtual column construction method based on a data lake provided by the embodiment of the present application, firstly, expression statistical analysis may be automatically performed on a large number of statements to be analyzed (for example, SQL statements under various engines) in the data lake, so as to obtain an expression to be used (for example, an expression "a+1") that meets a preset virtual column construction condition; next, a virtual column construction request corresponding to the expression to be used is automatically constructed according to virtual column construction description information (such as a column name, a data type, an expression, and the like) corresponding to the expression to be used, such that the virtual column construction request is used to request to construct a virtual column that can represent the expression to be used; and then, according to the virtual column construction request, a virtual column (for example, a virtual column with a character "c" as a column name) corresponding to the expression to be used is constructed, to enable the virtual column to represent the expression to be used, such that a user can automatically trigger a data query request for the expression to be used by means of a data query request for the virtual column (for example, an SQL statement of "SELECT c FROM t1") in the future, thus it is possible to avoid problems that occur when the user manually inputs the data query request for the expression to be used (for example, how to write a correct expression, etc.), thereby it is possible to effectively improve the user data query experience.

Data Query Process for Virtual Column

In fact, for a virtual column in a data table, since the virtual column is not used for recording data, a data query process for the virtual column is different from that for a regular column. Based on this, an embodiment of the present application further provides a data query method based on a data lake, as shown in FIG. 6, the method comprising S601-S603:

S601: acquiring a first data query request. The first data query request is used for requesting to perform a data query for a target virtual column.

The first data query request is used for requesting a data query for a target virtual column in a target data table. The target virtual column is constructed by using any of the implementations of the virtual column construction method based on a data lake provided by the embodiments of the present application; and the target data table refers to a data table to which the target virtual column belongs. For ease of understanding, the description will be made below in conjunction with examples.

As an example, when the above target data table is the above data table with the string "t1" as the table name, and the target virtual column is the above virtual column with the character "c" as the column name, the first data query request may specifically be the SQL statement shown in the 2nd row and 1st column in the Table 4.

S602: replacing the column name of the target virtual column in the first data query request with an expression corresponding to the target virtual column to obtain a second data query request.

In the embodiment of the present application, after a first data query request is acquired, first, a column name (for example, the character "c") of the target virtual column and a table name (for example, the string "t1") corresponding to the target virtual column may be extracted from the first data query request; next, a number mapping relation having a correspondence with the table name corresponding to the target virtual column is determined, such that the number mapping relation is used for recording numbers corresponding to respective virtual columns in the data table with the table name; next, a number corresponding to the column name of the target virtual column is searched for in the number mapping relation, as a number to be used; then, an expression (for example, an expression "a+1") corresponding to the number to be used is searched for from HiveMetaStore; and finally, the column name of the target virtual column in the first data query request is replaced with the expression to obtain a second data query request (for example, SELECT a+1 FROM t1).

S603: performing data query processing according to the second data query request.

In the embodiment of the present application, after the second data query request is acquired, first, an executable task corresponding to a second engine may be generated according to the second data query request; and then send, to the second engine, the executable task corresponding to the second engine, such that the second engine completes a data query process for the expression represented by the target virtual column by executing the executable task. The second engine refers to an execution engine for performing data query processing on the expression represented by the target virtual column; and the embodiment of the present application does not limit the second engine, for example, it may be an engine specified by a user, or an execution engine selected based on a current resource condition.

It should be noted that, the embodiment of the present application does not limit a generation process of the above "executable task corresponding to the second engine", for example, it may specifically be: after the second data query request is acquired, translating the second data query request into an executable task corresponding to the second engine according to a translation rule corresponding to the second engine.

Based on the related content of the above S601 to S603, it can be seen that, for the data query method based on a data lake provided by the embodiment of the present application, after a first data query request for requesting to perform a data query on a target virtual column in a target data table is acquired, first, the column name of the target virtual column in the first data query request may be replaced with an expression corresponding to the target virtual column, to obtain a second data query request; and then data query processing is performed according to the second data query request, so that it is possible to trigger a data query request for the expression to be used by means of a data query request for the virtual column (for example, an SQL statement "SELECT c FROM t1"), thus it is possible to avoid factors which need to be considered when a user inputs the expression to be used (for example, how to write a correct expression, etc.), thereby it is possible to effectively improve the user data query experience.

Based on the related content of the above virtual column construction method based on a data lake, an embodiment of the present application further provides a virtual column construction apparatus based on a data lake, which will be explained and described in conjunction with the accompanying drawings. It should be noted that, for the technical details of the virtual column construction apparatus based on a data lake provided in the present application, please refer to the related content of the above virtual column construction method based on a data lake.

Referring to FIG. 7, it is a schematic structural diagram of a virtual column construction apparatus based on a data lake provided by an embodiment of the present application.

The virtual column construction apparatus 700 based on a data lake provided by the embodiment of the present application comprises:

an expression determination unit 701 configured to determine an expression to be used from at least one statement to be analyzed, after acquiring the at least one statement to be analyzed;

an information determination unit 702 configured to determine virtual column construction description information corresponding to the expression to be used, wherein the virtual column construction description information comprises the expression to be used;

a request generation unit 703 configured to generate a virtual column construction request, according to the virtual column construction description information corresponding to the expression to be used; and a virtual column construction unit 704 configured to construct a virtual column corresponding to the expression to be used, according to the virtual column construction request.

In one possible implementation, the number of the statement to be analyzed is N; and the expression determination unit 701 comprises:

a first determination subunit configured to determine a n-th expression to be analyzed from a n-th statement to be analyzed, wherein n is a positive integer, n≤N, and N is a positive integer;

a first statistical subunit configured to perform statistical analysis processing on N expressions to be analyzed to obtain an expression statistical result; and a second determination subunit configured to, if the expression statistical result indicates that an occurrence frequency of a first expression in the N expressions to be analyzed is higher than a preset frequency threshold, determine the first expression as the expression to be used.

In one possible implementation, the first determination subunit is specifically configured to: perform syntax conversion processing on the n-th statement to be analyzed to obtain a syntax conversion result; and extract the n-th expression to be analyzed from the syntax conversion result.

In one possible implementation, the expression determination unit 701 further comprises:

a syntax tree construction subunit configured to perform syntax tree construction processing on the n-th expression to be analyzed to obtain a syntax tree of the n-th expression to be analyzed; and the first statistical subunit is specifically configured to: perform statistical analysis processing on syntax trees of the N expressions to be analyzed to obtain a statistical analysis result.

In one possible implementation, the virtual column construction description information further comprises a column name; and the information determination unit 702 comprises:

a third determination subunit configured to, if at least one statement to be referred exists in the at least one statement to be analyzed, determine the column name corresponding to the expression to be used from the at least one statement to be referred, wherein a preset semantic identity condition is met between an expression carried by the statement to be referred and the expression to be used, and the statement to be referred comprises a column name corresponding to the expression carried by the statement to be referred.

In one possible implementation, the third determination subunit comprises:

a second statistical subunit configured to perform statistical analysis processing on the column names corresponding to the expressions carried by the at least one statement to be referred to obtain a column name statistical result; and a fourth determination subunit configured to determine the column name corresponding to the expression to be used according to the column name statistical result.

In one possible implementation, the column names corresponding to the expressions carried by the at least one statement to be referred comprise a target column name; and the fourth determination subunit is specifically configured to: if the column name statistical result indicates that an occurrence frequency of the target column name meets a preset frequency condition, determining the target column name as the column name corresponding to the expression to be used.

In one possible implementation, the information determination unit 702 further comprises:

a fifth determination subunit configured to, if the statement to be referred does not exist in the at least one statement to be analyzed, determine a second expression from at least one expression to be matched which is preset, according to similarity representation data between the at least one expression to be matched and the expression to be used, wherein the similarity representation data between the second expression and the expression to be used meets a preset similarity condition;

a first searching unit configured to search for a column name corresponding to the second expression from a pre-constructed mapping relation, wherein the mapping relation is used for recording a correspondence between respective expressions to be matched and column names corresponding thereto; and a sixth determination subunit configured to determine the column name corresponding to the expression to be used according to the column name corresponding to the second expression.

In one possible implementation, the number of the expression to be matched is M; and the information determination unit 702 further comprises:

a seventh determination subunit configured to determine a field name vector and a keyword vector of the expression to be used; and an eighth determination subunit configured to determine similarity representation data between the m-th expression to be matched and the expression to be used, according to a similarity between the field name vector of the expression to be used and a field name vector of the m-th expression to be matched and a similarity between the keyword vector of the expression to be used and a keyword vector of the m-th expression to be matched.

In one possible implementation, the seventh determination subunit comprises:

a ninth determination subunit configured to perform field name extraction processing on the expression to be used to obtain a field name extraction result; and perform vectorizing processing on the field name extraction result to obtain the field name vector of the expression to be used.

In one possible implementation, the seventh determination subunit comprises:

a tenth determination subunit configured to perform keyword extraction processing on the expression to be used to obtain a keyword extraction result; and perform vectorizing processing on the keyword extraction result to obtain the keyword vector of the expression to be used.

In one possible implementation, the virtual column construction description information further comprises a data type; and the data type is determined according to a data type corresponding to a column name carried by the expression to be used.

Based on the related content of the above virtual column construction apparatus 700 based on a data lake, for the virtual column construction apparatus 700 based on a data lake provided by the embodiment of the present application, first, expression statistical analysis may be automatically performed on a large number of statements to be analyzed (for example, SQL statements under various engines) in the data lake to obtain an expression to be used (for example, an expression to be used with a relatively high occurrence frequency) that meets a preset virtual column construction condition; next, according to virtual column construction description information (such as a column name, a data type, an expression, and the like) corresponding to the expression to be used, a virtual column construction request corresponding to the expression to be used is automatically constructed, such that the virtual column construction request is used to request to construct a virtual column that can represent the expression to be used; and then, according to the virtual column construction request, a virtual column corresponding to the expression to be used is constructed, to enable the virtual column to represent the expression to be used, such that a user can automatically trigger a data query request for the expression to be used by means of a data query request for the virtual column in the future, thus it is possible to avoid problems (for example, how to write a correct expression, etc.) that occur when the user manually inputs the data query request for the expression to be used, thereby it is possible to effective improving the user data query experience.

Based on the related content of the above data query method based on a data lake, an embodiment of the present application further provides a data query apparatus based on a data lake, which will be explained and described below in conjunction with the accompanying drawings. It should be noted that, for the technical details of the data query apparatus based on a data lake provided in the present application, please refer to the related content of the above data query method based on a data lake.

Referring to FIG. 8, it is a schematic structural diagram of a data query apparatus based on a data lake provided by an embodiment of the present application.

The data query apparatus based on a data lake 800 provided by the embodiment of the present application comprises:

a request acquisition unit 801 configured to acquire a first data query request, wherein the first data query request is used for requesting to perform a data query for a target virtual column; wherein the target virtual column is constructed by using any of the implementations of the virtual column construction method based on a data lake provided by the present application;

an information replacement unit 802 configured to replace the column name of the target virtual column in the first data query request with an expression corresponding to the target virtual column to obtain a second data query request; and a data query unit 803 configured to perform data query processing according to the second data query request.

Based on the related content of the above data query apparatus 800 based on a data lake, it can be seen that, for the data query apparatus 800 based on a data lake provided by the embodiment of the present application, after a first data query request for requesting to perform a data query on a target virtual column in a target data table is acquired, it may first replace the column name of the target virtual column in the first data query request with an expression corresponding to the target virtual column to obtain a second data query request; and then perform data query processing according to the second data query request, such that it is possible to trigger a data query request for the expression to be used by means of a data query request (for example, an SQL statement of "SELECT c FROM t1") for the virtual column, thus it is possible to avoid factors (for example, how to write a correct expression, etc.) to be considered when a user inputs the expression to be used, thereby it is possible to effectively improve the user data query experience.

In addition, an embodiment of the present application further provides an electronic device, comprising a processor and a memory, wherein the memory is configured to store instructions or a computer program; and the processor is configured to execute the instructions or the computer program in the memory, such that the electronic device executes any of the implementations of the virtual column construction method based on a data lake provided by the embodiments of the present application, or executes any of the implementations of the data query method based on a data lake provided by the embodiments of the present application.

Referring to FIG. 9, it shows a schematic structural diagram of an electronic device 900 suitable for implementing the embodiment of the present disclosure. The terminal device in the embodiment of the present disclosure may include, but is not limited to, a mobile terminal such as a mobile phone, a notebook computer, a digital broadcast receiver, a PDA (Personal Digital Assistant), a PAD (tablet computer), a PMP (Portable Multimedia Player), a vehicle-mounted terminal (e.g., a vehicle-mounted navigation terminal), and the like, and a fixed terminal such as a digital TV, a desktop computer, and the like. The electronic device shown in FIG. 9 is only an example, and should not bring any limitation to the functions and the usage range of the embodiment of the present disclosure.

As shown in FIG. 9, the electronic device 900 may comprise a processing device 901 (e.g., a central processor, a graphics processor, etc.) that may perform various appropriate actions and processes according to a program stored in a read-only memory (ROM) 902 or a program loaded from a storage device 908 into a random access memory (RAM) 903. In the RAM 903, various programs and data required for the operation of the electronic device 900 are also stored. The processing device 901, ROM 902, and RAM 903 are connected to each other via a bus 904. An input/output (I/O) interface 905 is also connected to the bus 904.

Generally, the following device may be connected to the I/O interface 905: an input device 906 including, for example, a touch screen, touch pad, keyboard, mouse, camera, microphone, accelerometer, gyroscope, etc.; an output device 907 including, for example, a liquid crystal display (LCD), speaker, vibrator, etc.; the storage device 908 including, for example, a magnetic tape, hard disk, etc.; and a communication device 909. The communication device 909 may allow the electronic device 900 to communicate with other devices wirelessly or by wire to exchange data. While FIG. 9 illustrates an electronic device 900 having various device, it should be understood that not all illustrated devices are required to be implemented or provided. More or fewer devices may be alternatively implemented or provided.

In particular, according to an embodiment of the present disclosure, the above processes described with reference to the flow diagrams may be implemented as a computer software program. For example, an embodiment of the present disclosure includes a computer program product comprising a computer program carried on a non-transitory computer-readable medium, wherein the computer program contain program codes for performing the methods illustrated by the flow diagrams. In such an embodiment, the computer program may be downloaded and installed from a network through the communication device 909, or installed from the storage device 908, or installed from the ROM 902. The computer program, when executed by the processing device 901, performs the above functions defined in the methods of the embodiments of the present disclosure.

The electronic device provided by the embodiment of the present disclosure and the methods provided by the above embodiments belong to the same inventive concept, and for technical details that are not described in detail in this embodiment, reference can be made to the above embodiments, and this embodiment has the same beneficial effects as the above embodiments.

An embodiment of the present application further provides a computer-readable medium having therein stored instructions or a computer program which, when run on a device, cause the device to execute any of the implementations of the virtual column construction method based on a data lake provided by the embodiments of the present application, or to execute any of the implementations of the data query method based on a data lake provided by the embodiments of the present application.

It should be noted that the above computer-readable medium of the present disclosure may be a computer-readable signal medium or a computer-readable storage medium or any combination of the above two. The computer-readable storage medium may be, for example, but is not limited to, an electronic, magnetic, optical, electromagnetic, infrared, or semiconductor system, apparatus, or device, or any combination of the foregoing. More specific examples of the computer-readable storage medium may include, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer-readable storage medium may be any tangible medium containing or storing a program, wherein the program can be used by or in conjunction with an instruction execution system, apparatus, or device. However, in the present disclosure, the computer-readable signal medium may include a data signal propagated in baseband or as part of a carrier wave, in which computer-readable program codes are carried. Such a propagated data signal may take a variety of forms, including, but not limited to, an electromagnetic signal, optical signal, or any suitable combination of the forgoing. The computer-readable signal medium may also be any computer-readable medium other than the computer-readable storage medium, wherein the computer-readable signal medium can send, propagate, or transmit a program for use by or in conjunction with an instruction execution system, apparatus, or device. The program codes contained on the computer-readable medium may be transmitted using any appropriate medium, including but not limited to: a wire, an optical cable, RF (Radio Frequency), etc., or any suitable combination of the foregoing.

In some implementations, a client and a server may communicate using any currently known or future developed network protocol, such as HTTP (Hyper Text Transfer Protocol), and may be interconnected with any form or medium of digital data communication (e.g., a communication network). Examples of the communication network include a local area network ("LAN"), a wide area network ("WAN"), an internet (e.g., the Internet), and a peer-to-peer network (e.g., an ad hoc peer-to-peer network), as well as any currently known or future developed network.

The above computer-readable medium may be contained in the above electronic device; or may exist separately without being assembled into the electronic device.

The above computer-readable medium has one or more programs carried thereon, wherein the above one or more programs, when executed by the electronic device, cause the electronic device to perform the above methods.

Computer program codes for performing the operations of the present disclosure may be written in one or more programming languages or a combination thereof, wherein the above programming language includes but is not limited to an object-oriented programming language such as Java, Smalltalk, and C++, and also includes a conventional procedural programming language, such as a "C" language or a similar programming language. The program codes may be executed entirely on a user's computer, partly on a user's computer, as a stand-alone software package, partly on a user's computer and partly on a remote computer, or entirely on a remote computer or server. In a scenario where a remote computer is involved, the remote computer may be connected to a user's computer through any type of network, including a local area network (LAN) or a wide area network (WAN), or may be connected to an external computer (for example, through the Internet using an Internet service provider).

The flow diagrams and block diagrams in the drawings illustrate the possibly implemented architecture, functions, and operations of the system, method and computer program product according to various embodiments of the present disclosure. In this regard, each block in the flow diagrams or block diagrams may represent a module, a program segment, or a portion of codes, which includes one or more executable instructions for implementing a specified logical function. It should also be noted that, in some alternative implementations, functions noted in blocks may occur in a different order from those noted in the drawings. For example, two blocks shown in succession may, in fact, be executed substantially concurrently, or they may sometimes be executed in a reverse order, which depends upon the functions involved. It will also be noted that each block in the block diagrams and/or flow diagrams, and a combination of the blocks in the block diagrams and/or flow diagrams, can be implemented by a special-purpose hardware-based system that performs specified functions or operations, or by a combination of special-purpose hardware and computer instructions.

The involved units described in the embodiments of the present disclosure may be implemented by software or hardware. The name of the unit does not, in some cases, constitute a limitation on the unit itself.

The functions described above herein may be executed, at least partially, by one or more hardware logic components. For example, without limitation, a hardware logic component of an exemplary type that may be used includes: a field programmable gate array (FPGA), an application specific integrated circuit (ASIC), an application specific standard parts (ASSP), a system on chip (SOC), a complex programmable logic device (CPLD), and the like.

In the context of this disclosure, a machine-readable medium may be a tangible medium, which can contain or store a program for use by or in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium include an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

It should be noted that, in this description, the embodiments are described in a progressive manner, and each embodiment focuses on differences from other embodiments, so that for same and similar parts among the embodiments, reference may be made to each other. For the system or the apparatus disclosed by the embodiment, the description is simple since it corresponds to the method disclosed by the embodiment, so that reference can be made to the description of the method for the relevant points.

It should be understood that, in the present application, "at least one" refers to one or more, "a plurality" refers to two or more. "and/or", which is used for describing an association between associated objects, indicates that there may be three relations, for example, "A and/or B" may represent three cases: the presence of A alone, the presence of B alone, and the presence of A and B simultaneously, wherein A and B may be singular or plural. A character "/" generally indicates that preceding and succeeding objects associated are in an "or" relation. "At least one of the following items" or its similar expression refers to any combination of these items, including any combination of the singular or plural items. For example, at least one of a, b, or c, may represent: a, b, c, "a and b", "a and c", "b and c", or "a and b and c", where a, b and c may be single or plural.

It should also be noted that, relational terms such as "first" and "second", herein, are only used for distinguishing one entity or operation from another entity or operation without necessarily requiring or implying any such actual relation or order between these entities or operations. Moreover, the term "comprise", "include", or any other variation thereof, is intended to encompass a non-exclusive inclusion, such that a process, method, article, or device comprising a list of elements not only includes those elements but also includes other elements not expressly listed, or also includes elements inherent to such a process, method, article, or device. Without more limitations, an element defined by a statement "comprising a . . . " does not exclude the presence of another identical element in a process, method, article, or device that includes the element.

The steps of the method or algorithm described in conjunction with the embodiments disclosed herein may be implemented by directly using hardware, a software module executed by a processor, or a combination of the two. The software module may be provided in a random access memory (RAM), memory, read-only memory (ROM), electrically programmable ROM, electrically erasable programmable ROM, register, hard disk, removable disk, CD-ROM, or any other form of storage medium known in the art.

The above description of the disclosed embodiments enables those skilled in the art to implement or use the present application. Various modifications to these embodiments will be readily apparent to those skilled in the art, and the general principles defined herein may be implemented in other embodiments without departing from the spirit or scope of the present application. Therefore, the present application is not intended to be limited to these embodiments shown herein but to conform to the widest scope consistent with the principles and novel features disclosed herein.

What is claimed is:

1. A data query method based on a data lake, comprising:
acquiring a first data query request, wherein the first data query request is used for requesting to perform a data query for a target virtual column;
replacing a column name of the target virtual column in the first data query request with an expression corresponding to the target virtual column to obtain a second data query request; and
performing data query processing according to the second data query request, wherein the target virtual column is constructed by using following virtual column construction operations based on the data lake:
determining an expression to be used from at least one statement to be analyzed, after acquiring the at least one statement to be analyzed;
determining virtual column construction description information corresponding to the expression to be used, wherein the virtual column construction description information comprises the expression to be used and a column name corresponding to the expression to be used;
generating a virtual column construction request, according to the virtual column construction description information corresponding to the expression to be used; and
constructing a virtual column corresponding to the expression to be used, according to the virtual column construction request, and
wherein the at least one statement to be analyzed comprises a plurality of statements to be analyzed, and
determining the expression to be used from the at least one statement to be analyzed comprises: if an occurrence frequency of a first expression in a plurality of expressions to be analyzed corresponding to the plurality of statements to be analyzed is higher than a preset frequency threshold, determining the first expression as the expression to be used.

2. The method according to claim 1, wherein a number of the plurality of statements to be analyzed is N; and
determining the expression to be used from the at least one statement to be analyzed comprises:
determining an n-th expression to be analyzed from an n-th statement to be analyzed, wherein n is a positive integer, n≤N, and N is a positive integer;

performing statistical analysis processing on N expressions to be analyzed to obtain an expression statistical result; and if the expression statistical result indicates that the occurrence frequency of the first expression in the N expressions to be analyzed is higher than the preset frequency threshold, determining the first expression as the expression to be used.

3. The method according to claim 2, wherein determining the n-th expression to be analyzed from the n-th statement to be analyzed comprises:

performing syntax conversion processing on the n-th statement to be analyzed to obtain a syntax conversion result; and extracting the n-th expression to be analyzed from the syntax conversion result.

4. The method according to claim 2, wherein the method further comprises:

performing syntax tree construction processing on the n-th expression to be analyzed to obtain a syntax tree of the n-th expression to be analyzed; and performing the statistical analysis processing on the N expressions to be analyzed to obtain the expression statistical comprises:

performing the statistical analysis processing on syntax trees of the N expressions to be analyzed to obtain the expression statistical result.

5. The method according to claim 1, wherein a process of determining the column name corresponding to the expression to be used comprises:

if at least one statement to be referred exists in the at least one statement to be analyzed, determining the column name corresponding to the expression to be used from the at least one statement to be referred, wherein a preset semantic identity condition is met between an expression carried by the at least one statement to be referred and the expression to be used, and the at least one statement to be referred comprises a column name corresponding to the expression carried by the at least one statement to be referred.

6. The method according to claim 5, wherein the at least one statement to be referred comprises a plurality of statements to be referred, and determining the column name corresponding to the expression to be used from the at least one statement to be referred comprises:

performing statistical analysis processing on column names corresponding to expressions carried by the plurality of statements to be referred to obtain a column name statistical result; and determining the column name corresponding to the expression to be used according to the column name statistical result.

7. The method according to claim 6, wherein the column names corresponding to the expressions carried by the plurality of statements to be referred comprise a target column name; and determining the column name corresponding to the expression to be used according to the column name statistical result comprises:

if the column name statistical result indicates that an occurrence frequency of the target column name meets a preset frequency condition, determining the target column name as the column name corresponding to the expression to be used.

8. The method according to claim 5, wherein the method further comprises:

if the at least one statement to be referred does not exist in the at least one statement to be analyzed, determining a second expression from at least one expression to be matched which is preset, according to similarity representation data between the at least one expression to be matched and the expression to be used, wherein similarity representation data between the second expression and the expression to be used meets a preset similarity condition;

searching for a column name corresponding to the second expression from a pre-constructed mapping relation, wherein the mapping relation is used for recording a correspondence between respective expressions to be matched and column names corresponding thereto; and determining the column name corresponding to the expression to be used according to the column name corresponding to the second expression.

9. The method according to claim 8, wherein a number of the expressions to be matched is M; and a process of determining similarity representation data between an m-th expression to be matched and the expression to be used comprises:

determining a field name vector and a keyword vector of the expression to be used; and determining the similarity representation data between the m-th expression to be matched and the expression to be used, according to a similarity between the field name vector of the expression to be used and a field name vector of the m-th expression to be matched and a similarity between the keyword vector of the expression to be used and a keyword vector of the m-th expression to be matched, wherein m is a positive integer, $m \leq M$, and M is a positive integer.

10. The method according to claim 9, wherein at least one of following is implemented:

a process of determining the field name vector of the expression to be used comprises:

performing field name extraction processing on the expression to be used to obtain a field name extraction result; and performing vectorizing processing on the field name extraction result to obtain the field name vector of the expression to be used; or a process of determining the keyword vector of the expression to be used comprises:

performing keyword extraction processing on the expression to be used to obtain a keyword extraction result; and performing vectorizing processing on the keyword extraction result to obtain the keyword vector of the expression to be used.

11. The method according to claim 1, wherein the virtual column construction description information further comprises a data type corresponding to the expression to be used; and the data type is determined according to a data type corresponding to a column name carried by the expression to be used.

12. An electronic device, comprising: a processor and a memory, wherein the memory is configured to store instructions or a computer program; and the processor is configured to execute the instructions or the computer program in the memory, such that the electronic device performs following data query operations based on a data lake:

acquiring a first data query request, wherein the first data query request is used for requesting to perform a data query for a target virtual column;

replacing a column name of the target virtual column in the first data query request with an expression corresponding to the target virtual column to obtain a second data query request; and performing data query processing according to the second data query request, wherein the target virtual column is constructed by using following virtual column construction operations based on the data lake:

determining an expression to be used from at least one statement to be analyzed, after acquiring the at least one statement to be analyzed;

determining virtual column construction description information corresponding to the expression to be used, wherein the virtual column construction description information comprises the expression to be used and a column name corresponding to the expression to be used;

generating a virtual column construction request, according to the virtual column construction description information corresponding to the expression to be used; and constructing a virtual column corresponding to the expression to be used, according to the virtual column construction request, and wherein the at least one statement to be analyzed comprises a plurality of statements to be analyzed, and determining the expression to be used from the at least one statement to be analyzed comprises: if an occurrence frequency of a first expression in a plurality of expressions to be analyzed corresponding to the plurality of statements to be analyzed is higher than a preset frequency threshold, determining the first expression as the expression to be used.

13. The electronic device according to claim 12, wherein a number of the plurality of statements to be analyzed is N; and determining the expression to be used from the at least one statement to be analyzed comprises:

determining an n-th expression to be analyzed from an n-th statement to be analyzed, wherein n is a positive integer, n≤N, and N is a positive integer;

performing statistical analysis processing on N expressions to be analyzed to obtain an expression statistical result; and if the expression statistical result indicates that the occurrence frequency of the first expression in the N expressions to be analyzed is higher than the preset frequency threshold, determining the first expression as the expression to be used.

14. The electronic device according to claim 13, wherein determining the n-th expression to be analyzed from the n-th statement to be analyzed comprises:

performing syntax conversion processing on the n-th statement to be analyzed to obtain a syntax conversion result; and extracting the n-th expression to be analyzed from the syntax conversion result.

15. The electronic device according to claim 13, wherein the instructions are executed or the computer program is executed such that the electronic device further performs a following operation:

performing syntax tree construction processing on the n-th expression to be analyzed to obtain a syntax tree of the n-th expression to be analyzed; and performing the statistical analysis processing on the N expressions to be analyzed to obtain the expression statistical result comprises:

performing the statistical analysis processing on syntax trees of the N expressions to be analyzed to obtain the expression statistical result.

16. A non-transitory computer-readable storage medium having therein stored instructions or a computer program which, when run on a device, cause(s) the device to perform following data query operations based on a data lake:

acquiring a first data query request, wherein the first data query request is used for requesting to perform a data query for a target virtual column;

replacing a column name of the target virtual column in the first data query request with an expression corresponding to the target virtual column to obtain a second data query request; and performing data query processing according to the second data query request, wherein the target virtual column is constructed by using following virtual column construction operations based on the data lake:

determining an expression to be used from at least one statement to be analyzed, after acquiring the at least one statement to be analyzed;

determining virtual column construction description information corresponding to the expression to be used, wherein the virtual column construction description information comprises the expression to be used and a column name corresponding to the expression to be used;

generating a virtual column construction request, according to the virtual column construction description information corresponding to the expression to be used; and constructing a virtual column corresponding to the expression to be used, according to the virtual column construction request, and wherein the at least one statement to be analyzed comprises a plurality of statements to be analyzed, and determining the expression to be used from the at least one statement to be analyzed comprises: if an occurrence frequency of a first expression in a plurality of expressions to be analyzed corresponding to the plurality of statements to be analyzed is higher than a preset frequency threshold, determining the first expression as the expression to be used.

17. The non-transitory computer-readable storage medium according to claim 16, wherein a number of the plurality of statements to be analyzed is N; and determining the expression to be used from the at least one statement to be analyzed comprises:

determining an n-th expression to be analyzed from an n-th statement to be analyzed, wherein n is a positive integer, n≤N, and N is a positive integer;

performing statistical analysis processing on N expressions to be analyzed to obtain an expression statistical result; and if the expression statistical result indicates that the occurrence frequency of the first expression in the N expressions to be analyzed is higher than the preset frequency threshold, determining the first expression as the expression to be used.

18. The non-transitory computer-readable storage medium according to claim 17, wherein determining the n-th expression to be analyzed from the n-th statement to be analyzed comprises:

performing syntax conversion processing on the n-th statement to be analyzed to obtain a syntax conversion result; and extracting the n-th expression to be analyzed from the syntax conversion result.

19. The non-transitory computer-readable storage medium according to claim 17, wherein the instructions or the computer program which, when run on the device, cause(s) the device to further perform a following operation:

performing syntax tree construction processing on the n-th expression to be analyzed to obtain a syntax tree of the n-th expression to be analyzed; and performing the statistical analysis processing on the N expressions to be analyzed to obtain the expression statistical result comprises:

performing the statistical analysis processing on syntax trees of the N expressions to be analyzed to obtain the expression statistical result.

20. The non-transitory computer-readable storage medium according to claim 16, wherein a process of determining the column name corresponding to the expression to be used comprises:

if at least one statement to be referred exists in the at least one statement to be analyzed, determining the column name corresponding to the expression to be used from the at least one statement to be referred, wherein a preset semantic identity condition is met between an expression carried by the statement to be referred and the expression to be used, and the statement to be referred comprises a column name corresponding to the expression carried by the statement to be referred.

* * * * *